(12) United States Patent
Farah et al.

(10) Patent No.: US 12,007,469 B1
(45) Date of Patent: Jun. 11, 2024

(54) TRAJECTORY DETERMINATION SYSTEM USING POSITIONAL SENSING TO DETERMINE THE MOVEMENT OF PEOPLE OR OBJECTS

(71) Applicant: Density, Inc., San Francisco, CA (US)

(72) Inventors: Andrew Farah, San Francisco, CA (US); Zach Brand, Sunnyvale, CA (US); Emre Sonmez, Atherton, CA (US); John Shanley, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/503,060

(22) Filed: Nov. 6, 2023

Related U.S. Application Data

(63) Continuation-in-part of application No. 18/365,823, filed on Aug. 4, 2023.

(51) Int. Cl.
*G01S 13/58* (2006.01)
*G06Q 10/047* (2023.01)
*G06Q 10/0631* (2023.01)

(52) U.S. Cl.
CPC .......... *G01S 13/581* (2013.01); *G06Q 10/047* (2013.01); *G06Q 10/06312* (2013.01)

(58) Field of Classification Search
CPC ................ G01S 13/581; G06Q 10/047; G06Q 10/06312

USPC .............................. 342/27, 160, 357.21, 445
See application file for complete search history.

(56) References Cited

U.S. PATENT DOCUMENTS

2016/0245907 A1\* 8/2016 Parker .................. B64C 39/024

\* cited by examiner

*Primary Examiner* — Bo Fan
(74) *Attorney, Agent, or Firm* — Maynard Nexsen PC; Brian T. Sattizahn, Esq.

(57) ABSTRACT

A positional sensing system includes a plurality of positional sensing devices which are situated at regular intervals within an environment and collect data for tracking objects moving within the environment. The positional sensing system is used to determine the occupancy and trajectories of people within the environment. The system can determine whether certain areas of the environment need to be cleaned based on occupancy. When a threshold level of use is detected for one or more areas of the environment, the positional sensing system dynamically determines that one or more areas require cleaning, and can generate a cleaning plan for the one or more areas. The positional sensing system can determine an optimal cleaning route through the environment based on the location of one or more areas. Once the cleaning plan is generated, the system can provide the cleaning plan to a user of the positional sensing system for utilization.

20 Claims, 22 Drawing Sheets

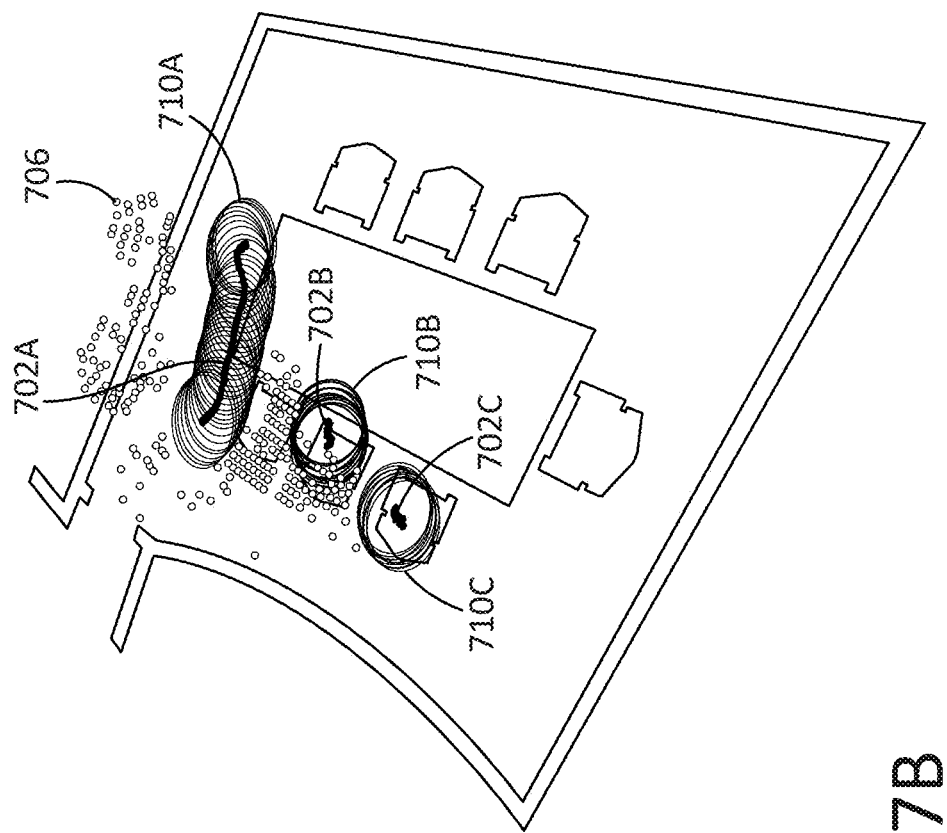
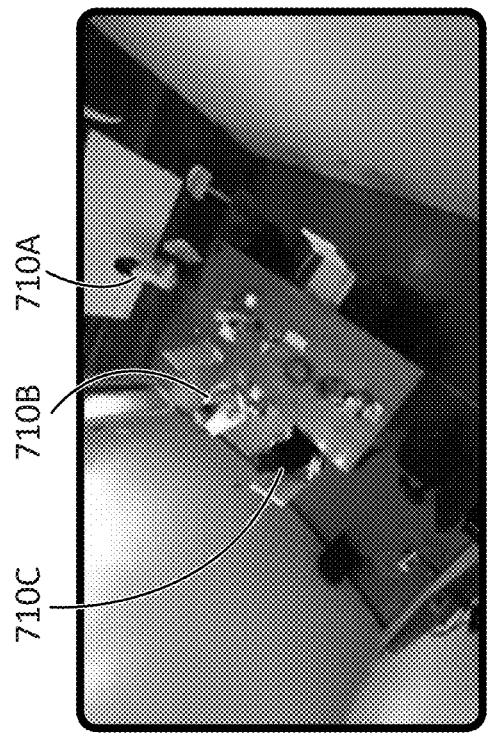
FIG. 7B

| NO. | TYPE | SPACE NAME | CLEANING |
|---|---|---|---|
| ☐ ① | MEETING ROOM | 03.100 | ⊗ ⊗ |
| ☐ ② | MEETING ROOM | 03.101 | ⊗ ⊗ |
| ☐ ③ | MEETING ROOM | 03.102 | ○ |
| ☐ ④ | MEETING ROOM | 03.103 | ⊗ ⊗ |
| ☐ ⑤ | MEETING ROOM | 03.104 | ○ |
| ☐ ⑥ | MEETING ROOM | 03.105 | ⊗ ⊗ |
| ☐ ⑦ | MEETING ROOM | 03.106 | ⊗ ⊗ |
| ☐ ⑧ | MEETING ROOM | 03.107 | ○ |
| ☐ ⑨ | MEETING ROOM | 03.108 | ○ |
| ☐ ⑩ | MEETING ROOM | 03.109 | ⊗ ⊗ |
| ☐ ⑪ | MEETING ROOM | 03.110 | ● ● ● |
| ☐ ⑫ | MEETING ROOM | 03.200 | ⊗ ⊗ |
| ☐ ⑬ | MEETING ROOM | 03.201 | ○ |
| ☐ ⑭ | MEETING ROOM | 03.202 | ● ● ● |
| ☐ ⑯ | MEETING ROOM | 03.204 | ○ |
| ☐ ⑰ | DESK | 03.225.03 | ○ |
| ☐ ⑳ | DESK | 03.225.06 | ○ |
| ☐ ㉑ | MEETING ROOM | 03.225.B1.B2 | ⊗ ⊗ |
| ☐ ㉒ | DESK | 03.225.B3 | ⊗ ⊗ |
| ☐ ㉘ | DESK | 03.225.B6 | ○ |
| ☐ ㉙ | DESK | 03.225.B7 | ○ |
| ☐ ㉚ | DESK | 03.225.B8 | ○ |
| ☐ ㉛ | DESK | 03.225.C3 | ⊗ ⊗ |
| ☐ ㉜ | DESK | 03.225.C5 | ⊗ ⊗ |
| ☐ ㉟ | DESK | 03.225.C6 | ○ |
| ☐ ㊱ | DESK | 03.225.C7 | ○ |
| ☐ ㊲ | DESK | 03.225.C8 | ⊗ ⊗ |
| ☐ ㊳ | DESK | 03.225.D3 | ⊗ ⊗ |
| ☐ ㊵ | DESK | 03.225.D4 | ○ |
| ☐ ㊶ | DESK | 03.225.D5 | ○ |
| ☐ ㊷ | MEETING ROOM | 03.225.E1.E2 | ⊗ ⊗ |
| ☐ ㊸ | DESK | 03.225.E3 | ○ |
| ☐ ㊺ | DESK | 03.225.E4 | ○ |
| ☐ ㊻ | DESK | 03.225.E5 | ○ |
| ☐ ㊼ | DESK | 03.225.E6 | ○ |
| ☐ ㊽ | DESK | 03.225.F1 | ○ |
| ☐ ㊿ | DESK | 03.225.F3 | ○ |
| ☐ 52 | DESK | 03.225.F5 | ○ |
| ☐ 53 | DESK | 03.225.F6 | ⊗ ⊗ |
| ☐ 54 | DESK | 03.225.F7 | ⊗ ⊗ |
| ☐ 55 | DESK | 03.225.F8 | ○ |
| ☐ 56 | DESK | 03.225.G1 | ○ |

FIG. 17B

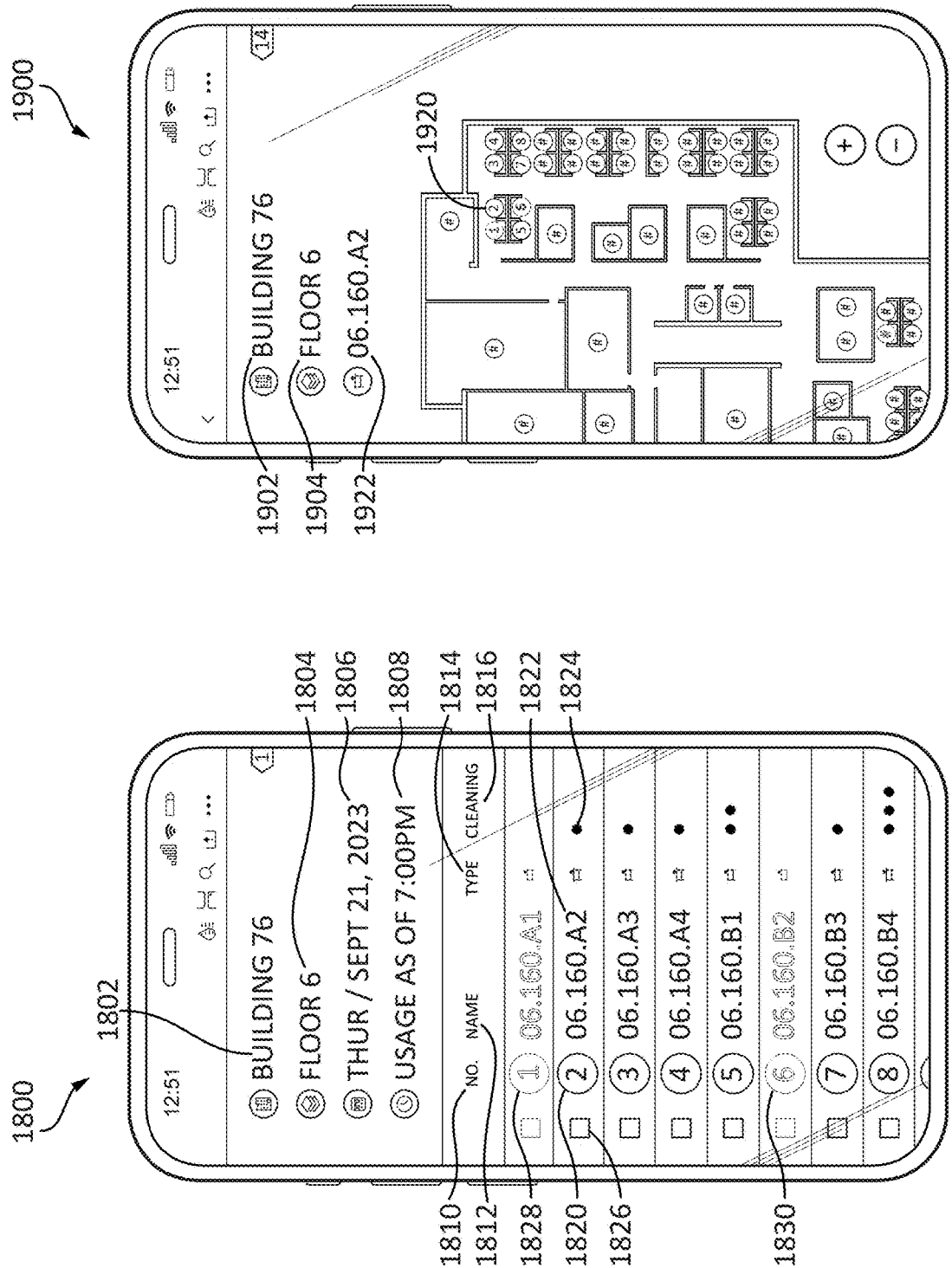

TRAJECTORY DETERMINATION SYSTEM USING POSITIONAL SENSING TO DETERMINE THE MOVEMENT OF PEOPLE OR OBJECTS

CROSS REFERENCE TO RELATED APPLICATIONS

This application is a continuation-in-part and claims priority to U.S. Non-Provisional application Ser. No. 18/365,823, entitled "TRAJECTORY DETERMINATION SYSTEM USING POSITIONAL SENSING TO DETERMINE THE MOVEMENT OF PEOPLE OR OBJECTS" and filed on Aug. 4, 2023, which is incorporated herein by reference. U.S. Non-Provisional application Ser. No. 18/365,823 is related to U.S. Non-Provisional application Ser. No. 17/551,560, entitled "OCCUPANCY ANALYSIS SYSTEM USING DEPTH SENSING TO DETERMINE THE MOVEMENT OF PEOPLE OR OBJECTS" and filed on Dec. 15, 2021, which is incorporated herein by reference. U.S. application Ser. No. 17/551,560 claims priority to U.S. Non-Provisional Application Ser. No. 16/844,749, entitled "OCCUPANCY ANALYSIS SYSTEM USING DEPTH SENSING TO DETERMINE THE MOVEMENT OF PEOPLE OR OBJECTS" and filed on Apr. 9, 2020, which is incorporated herein by reference. U.S. application Ser. No. 16/844,749 claims priority to U.S. Provisional Application No. 62/832,794, entitled "OCCUPANCY ANALYSIS SYSTEM USING DEPTH SENSING TO DETERMINE THE MOVEMENT OF PEOPLE OR OBJECTS" and filed on Apr. 11, 2019, which is incorporated herein by reference.

BACKGROUND

In modern society, large amounts of data are constantly being collected, revealing patterns and trends about human behavior that can be invaluable to businesses. Brick and mortar establishments (for instance, businesses) may have an interest in knowing the number of people that pass through their doors. Such data may be helpful in understanding their normal flow of business, identifying busier and quieter times, and evaluating the success of promotions or events, among many other things. Customers may also wish to know how busy a place is at a particular time, to predict their own wait time and avoid periods of high congestion without having to physically visit the space to observe its occupancy. Businesses may also wish to know trajectories of people visiting their establishment to better optimize the establishment's layout. However, as the amount and accuracy of collected data increases, so too does society's desire for privacy and security of personally-identifiable information. Therefore, an establishment's and its customers' desire for accurate people count data and trajectories conflicts with the wish to avoid overly invasive forms of surveillance.

Existing people counting solutions are insufficient to address this conflict. Human-performed, manual solutions, such as observational studies or tally-counting (with a clicker) require a dedicated human observer, cannot be performed at all times, and may be prone to error. Therefore, those solutions lack accuracy and scalability. Solutions implemented through other types of existing technology are similarly inadequate. While increased accuracy of counting can be obtained through, e.g., the use of optical cameras or badge/fob data (typically RFID), such methods of data collection create or rely upon repositories of personally-identifiable information, thereby sacrificing anonymity. Some technical solutions may offer increased privacy, through the use of, e.g., thermal cameras, motion sensors (passive infrared), break beam sensors, and the like, but once again sacrifice accuracy of results. For example, those existing anonymous solutions may have limited range of detection or may be unable to classify or identify objects as human (as compared to, e.g., animals or inorganic objects), leading to false positives. In some cases, these solutions may suffer from problems relating to depth of field, occlusion, and/or stereoscopic vision. Solutions implemented by third-party proxies, such as the aggregation of point-of-sale data, energy consumption tracking, or Wi-Fi MAC address tracking may be insufficiently imprecise, as they track only data tangential to people count and may also collect personally-identifiable information (device data). Further, solutions such as Wi-Fi MAC address tracking may be rendered inaccurate by MAC address randomization or other privacy protecting efforts used by device vendors.

Therefore, additional solutions to provide anonymous, accurate, real-time people counting and trajectory are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 7B depicts how the positional sensing system uses tracking data to identify objects and object trajectories, in accordance with some embodiments of the present disclosure.

FIG. 17B depicts a list of areas to be cleaned according to an exemplary dynamic cleaning plan, in accordance with some embodiments of the present disclosure.

FIG. 18 depicts a list of spaces to be cleaned according to an exemplary dynamic cleaning plan as displayed by a smart device, in accordance with some embodiments of the present disclosure.

FIG. 19 depicts an exemplary dynamic cleaning plan as displayed by a smart device, in accordance with some embodiments of the present disclosure.

The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1A:
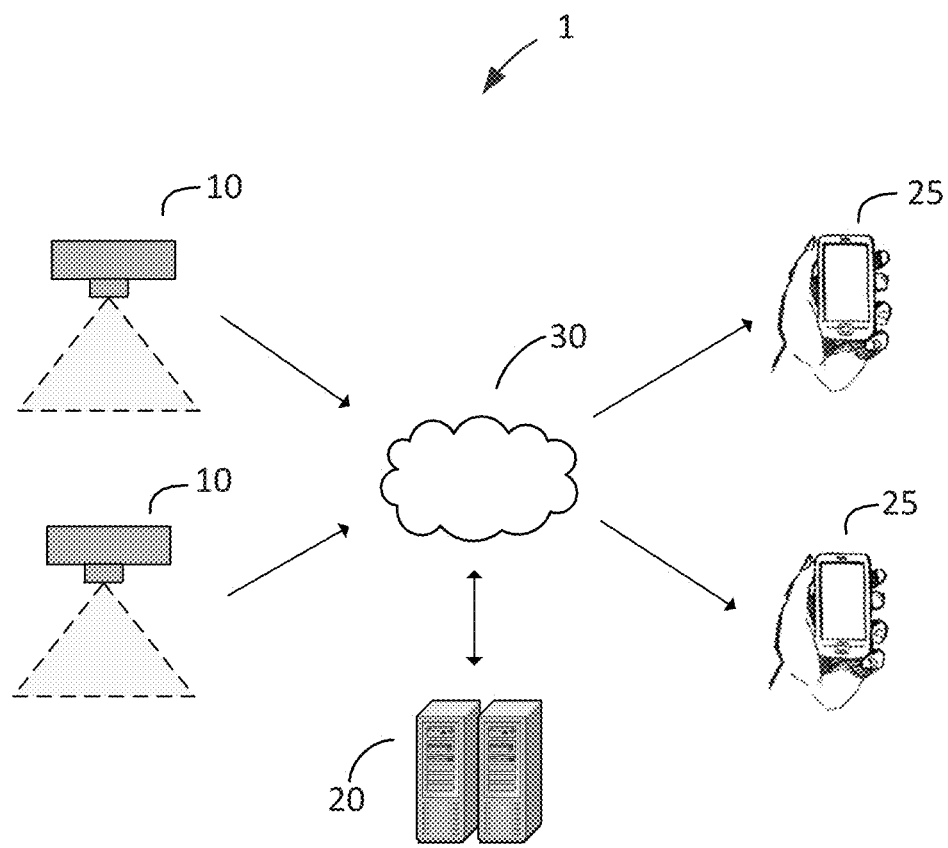
FIG. 1A is a block diagram of a positional sensing system in which a positional sensing device can be used in accordance with some embodiments of the present disclosure.

A depth sensing device may be used to recognize the movement of objects through a doorway or within an open space. In one embodiment, a plurality of devices are positioned throughout a floorplan of a building. Each device can be configured to emit a pulses, such as Doppler pulses. The pulses reflect off the various surfaces of the environment, and a phase shift of the emitted pulses is detected by sensors of each device. The changes in the phase shift data over time can be used to generate privacy-friendly positional data for moving objects within the environment. The sensors of each device can also detect a change in amplitude in the emitted pulses reflected off the various surfaces of the environment. For example, the sensors can use the detected change in amplitude to determine the size of an object traveling through the environment. In this regard, when the change in amplitude indicates that the object is too small to be associated with an object of interest, such as a human (e.g., when the change in amplitude is sufficiently large), the system can filter out phase shift data that is associated with the small object.

The plurality of sensors can collect timestamp data that identifies the time that each data point of the phase shift and/or amplitude change data was collected. The phase data and the timestamp data from the plurality of devices can be sent to a server to generate tracking data that identifies the trajectory of objects within the environment over time. Typically, the tracking data is accompanied by information sufficient to uniquely identify the device, such as a device name or ID, a network ID, a MAC address, or the like. This tracking data can additionally be used to determine occupancy within the environment in real time.

In some embodiments, moving objects identified in the positional data may be classified as one or more human subjects, while retaining the anonymity of the subjects' identity. In some embodiments, additional sensors may be used, such as the depth sensor previously described in U.S. Non-Provisional Application Ser. Nos. 17/551,560 and 16/844,749 to identify when objects cross a threshold, such as a doorway of an environment.

In some embodiments, the positional data from the plurality of sensors is aggregated by the server. The server can include a first module that is configured to cluster the positional data into one or more clusters for each point of time as indicated by the timestamp data. Each cluster can be identified as a unique object within the environment by the first module of the server. The server can also include a second module. The second module can include logic that is configured to generate what is referred to herein as "tracklets" that track the change in position of the clusters over time based on the positional data. The server can also include a third module that includes logic that is configured to determine a trajectory for each of the one or more detected objects indicated by the clusters by connecting tracklets together that are associated with the same detected object.

In some embodiments, a processor of the server may utilize one or more algorithms to determine which clusters of positional data to connect together to form trajectories for unique objects detected within the environment. For example, the processor may include logic configured to connect tracklets together based on a reward function that selects the tracklets that are most likely associated with the same object.

In some embodiments, the server may utilize different algorithms for tracking trajectories of objects depending on the objects speed of travel. For example, the server can utilize a first reward function that is optimized for tracking moving objects and a second reward function optimized for tracking relatively static objects. Accordingly, the second module may utilize the first reward function to generate tracklets, and the third module may utilize the second reward function to connect tracklets that the server determines are associated with the same object.

In some embodiments, the server may be configured to store a map of the environment and the one or more proximity sensors within the environment. For example, each of the one or more proximity sensors may be assigned respective coordinates within the map of the environment. Based upon the coordinates, the server may include logic that merges the captured positional data from each of the plurality of positional sensors to form the tracklets that track the trajectory of objects within the environment.

According to some embodiments, the map of the environment (e.g., floor plan) may be divided into discrete sections using a grid pattern (hereafter, referred to as a lattice). Each sensor may be assigned respective coordinates within the lattice, and objects that are detected by more than one sensor can be merged if their detected locations match the same lattice coordinates beyond a 'threshold level of similarity. In this way, the tracklets determined based on the positional data from each of the plurality of positional sensors can have a one to one relationship with the objects within the environment. In other words, each tracklet can be associated with a distinct object's trajectory within the environment, and each object can be associated with a single tracklet representing the trajectory of that object throughout the environment.

In some embodiments, the server may be configured to generate trajectories for the detected objects in substantially real-time. In other embodiments, the server may be configured to use historical data in order to increase the accuracy of the determined trajectories of objects within the environment. For example, the server may aggregate positional data and associated timestamp data. The positional data can be chunked into discrete time portions, which can be times portions on the order of several seconds, a minute, several minutes, an hour, etc. The reward function logic can be configured to select for trajectories that align the known positions of an object across the discrete time portions to increase the accuracy of the determined trajectories.

In some embodiments, the trajectories may be used by the system to determine occupancy metrics. The occupancy metrics are made available for inspection through an API. As described above, data from several devices, positioned at different locations may be aggregated together to determine an accurate people count within the environment.

In another embodiment, in addition to positional data, the positional sensing device may collect and transmit data about the health or status of the device. In some embodiments, the device may also collect external ambient data. For example, the device may include an accelerometer that tracks vibrations (such as door slams) even where no visual effect can be seen. In another embodiment, the device may include an ambient light sensor to track lighting within or of the space. The various collected information may be provided to an external server for analysis.

In one embodiment, the positional data is processed by the server so as to be analyzed at various granularities of physical and logical space. These may be understood as virtual spaces that exist within a hierarchy of perception, such that positions of objects (e.g., people) may be tracked within a nested set of geographic spaces, such as a room, a floor, a building, or a campus, and/or logical spaces, such as an organizational grouping (e.g., a department or set of people) or a non-contiguous subset of rooms or geographic spaces. In one embodiment, the count data is distributed to one more users via an API so as to be accessible from a mobile or other computing device, and may be filtered upon or otherwise manipulated at the level of different virtual spaces.

In various embodiments, the positional data that is generated by the system can be leveraged to facilitate various applications. For example, it may be desirable for business organizations to learn whether certain areas within their brick and mortar locations are being underutilized, overutilized, or properly utilized. A business may desire to optimize the amount of space dedicated to desk space, meeting room space, etc. in order to maximize efficiency. Further, businesses often spend significant resources and time on nightly cleaning of areas of a business that went unused, or were only lightly used during the working day and not in need of a deep clean. Areas such as cafeterias, break rooms, and bathrooms are often cleaned at regular intervals during the day, and often the frequency and timing of these intra-day cleanings are not optimal for the frequency of use a respective space exhibits. Accordingly, the disclosed systems and methods are also directed towards optimizing resource allocation in the context of dynamically cleaning areas of a business that exhibit a threshold amount of use.

FIG. 1A depicts an illustrative block diagram of a positional sensing system 1 in accordance with some embodiments. As illustrated, a positional sensing system 1 includes a plurality of positional sensing devices 10, each monitoring a separate or overlapping physical space, one or more remote servers 20, a network 30, one or more mobile devices (such as a mobile phone or iPad) or alternate computing devices (such as a mobile device or PC) 25, and one or more third party servers 35. Network 30 may comprise one or more network types, e.g., a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network or any combination thereof. In some embodiments, the network 30 may be the Internet and information may be communicated between system components in an encrypted format via a transport layer security (TLS) or secure socket layer (SSL) protocol. In addition, when the network 30 is the Internet, the components of the positional sensing system 1 may use the transmission control protocol/Internet protocol (TCP/IP) for communication. In an exemplary embodiment, remote server 20 may include one or more servers operated and managed by a single entity, however, in other embodiments, processing may be distributed between multiple entities at different geographic locations. In still other embodiments, remote server 20 need not actually be physically or logically "remote" to the positional sensing devices 10, and the processing may instead be performed at a server or share (whether dedicated or not) connected by a local area network. The one or more third party servers 35 can each be associated with one or more third-parties. Data collected by the positional sensing system 1 (e.g., occupancy data, trajectory data, etc.) can be provided to one or more third parties via the one or more third party servers 35 via an API of the positional sensing system 1. In some embodiments, the one or more third parties can utilize the data collected by the positional sensing system 1 to accomplish certain occupancy related tasks associated with a brick and mortar location. For example, the third party can automatically "release" a meeting room within a reservation system managed by the third party server 35 in response to receiving positional data indicating that the respective meeting room has been unoccupied for a threshold amount of time In an exemplary embodiment, the components of the positional sensing system 1 facilitate the collection of positional data based on a Doppler shift of microwave radiation that is emitted from a pulse emitter of each positional sensing device 10 and reflected from objects within the environment. The positional data is then provided to the remote server 20, and remote server 20 aggregates the positional data from all the positional sensing devices and converts the positional data into trajectory data for one or more objects within the environment. In some examples, the server identifies which of the one or more detected objects are associated with humans within the environment prior to converting the positional data into trajectory data. The trajectory data can be used to determine anonymous people count data over time within the environment. The components of the positional sensing system may also facilitate the access and display of the trajectory data and anonymous people count data by mobile device 25.

Figure 1B:
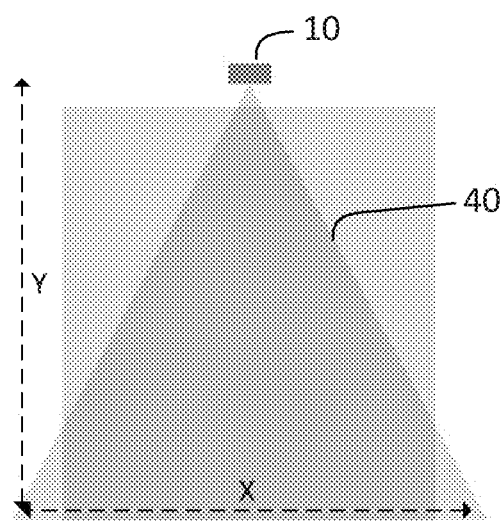
FIG. 1B depicts the placement of a positional sensing device in accordance with some embodiments of the present disclosure.

FIG. 1B is a diagram showing the placement of an exemplary depth sensing device 10. Device 10 is typically configured for indoor installation, however, in alternate implementations, the device may be used in outdoor or partially outdoor conditions (e.g., over a gate or open air tent). In general, however, the device 10 may be understood to be situated in regular intervals within an indoor space such as rooms, offices, cafes, bars, restaurants, bathrooms, retail entrances, bookstores, fitness centers, libraries, museums, and churches, among many other types of facilities. The positioning of the device 10 may be selected to balance the need for a sufficiently large field of view 40 while allowing for some overlap within the field of view 40 of adjacent devices 10. As illustrated in FIG. 1B, device 10 is situated so as to have a field of view 40 with a maximum width X and a maximum length Y. In some embodiments, one or more devices 10 may be arranged from the ceiling (or another elevated point) within an open space of an environment to track the change in position of moving objects (e.g., people) within the bounds of a set physical space. As one example, at a retail space or convention space, a device 10 could be positioned above an area of interest (e.g., where a new product is located) to gauge interest by the number of people who enter the bounded area, though of course many other applications are possible.

Figure 2A:
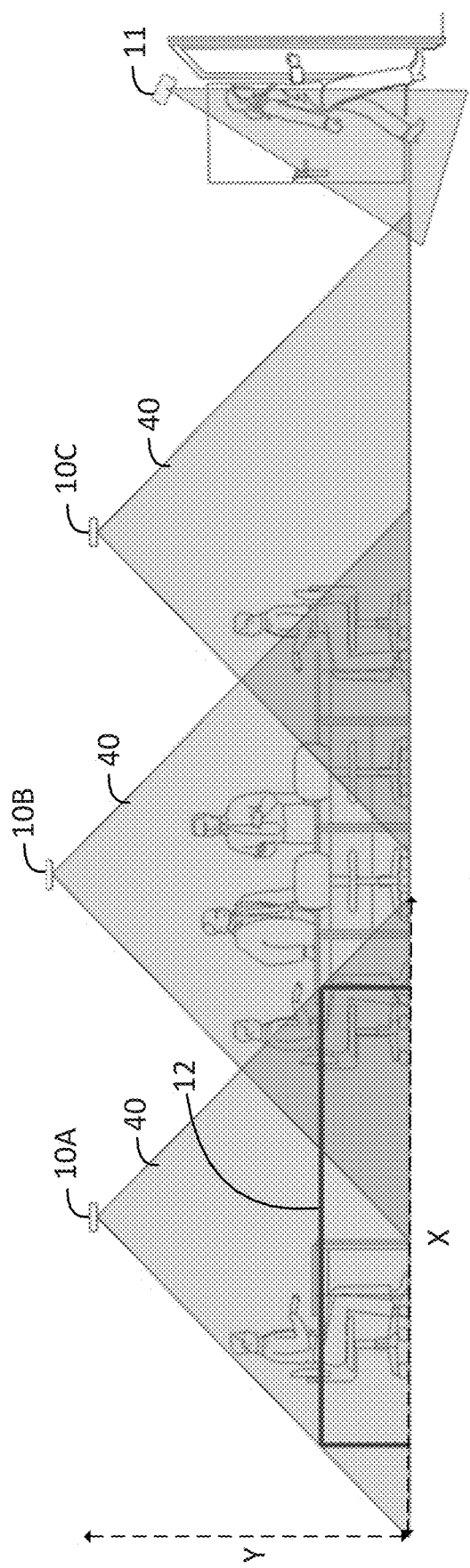
FIG. 2A depicts the placement of a plurality of positional sensing devices in accordance with some embodiments of the present disclosure.
Figure 2B:
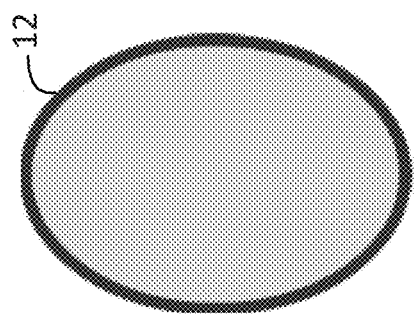
FIG. 2B depicts a cross sectional area monitored by a positional sensing device in accordance with some embodiments of the present disclosure.

FIG. 2A depicts the placement of a plurality of positional sensing devices in accordance with some embodiments of the present disclosure. FIG. 2A shows a plurality of positional sensing devices 10A, 10B, and 10C placed with overlapping field of view 40 such that the field of view 40 of positional sensing device 10A overlaps with positional sensing device 10B and the field of view 40 of positional sensing device 10B overlaps with field of view 40 of positional sensing device 10C. FIG. 2A also shows a depth sensing device 11 as described in related U.S. patent application Ser. Nos. 17/551,560 and 16/844,749, which may be used in tandem with positional sensing devices 10 to improve the accuracy of people count data determined by the positional sensing system 1. In some embodiments, the depth sensing device 11 may be replaced with another positional sensing device 10 which can be configured to track the movement of objects through doorways or thresholds. As shown field of view 40 of positional sensing device 10A can include a cross section area 12 that is monitored by positional sensing device 10A. The cross sectional area 12 is better seen in FIG. 2B, which shows that the cross sectional area 12, as viewed from the perspective of the positional sensing device 10A, can take the form of an ellipse or circular shape. In this respect, a positional sensing device can accurately monitor the movement of an object anywhere within the cross sectional area 12 depicted in FIG. 12B. While each positional sensing device 10A can monitor objects anywhere within the field of view 40, tracking is most accurate within the cross section area 12. For this reason, in certain embodiments, the positional sensing devices 10 are placed such that the fields of view 40 are at least partially overlapping, as shown in FIG. 2A.

Figure 3:
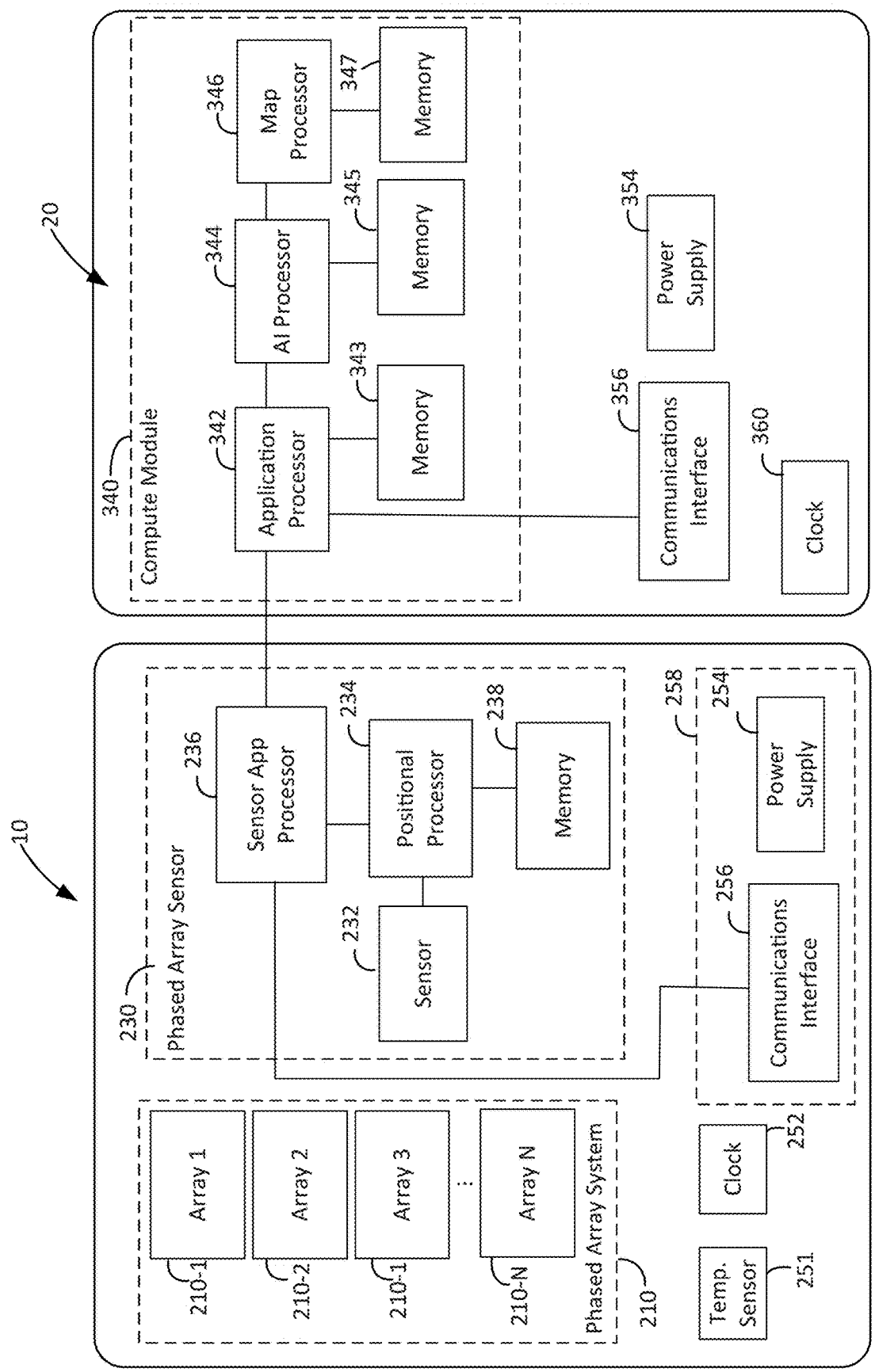
FIG. 3 is a diagram of certain component parts of a positional sensing device and remote server, in accordance with some embodiments of the present disclosure.

FIG. 3 illustrates an example schematic diagram of components of an exemplary positional sensing device 10 and server 20. Positional sensing device 10 includes a phased array system 210 and a depth sensor 230. The server can include a compute module 340. The various components of modules 210, 230, and 340 may be interconnected and may communicate with and/or drive other modules via one or more local interfaces (not shown), which may include at least one communication bus. However, any practical configuration of the illustrated components may be used, and the components need not fall into the particular logical groupings illustrated in FIG. 3. Further, It will be understood that the architectures described below and illustrated in FIG. 3 are not limited to the components discussed herein, and may include other hardware and software components. Rather, for ease of explanation, only the components and functionalities most relevant to the subject systems and methods are discussed herein.

Device 10 and server 20 can include a number of processors that may execute instructions stored in a corresponding memory to control the functionalities of the respective device or server. Typically, these processors (positional processor 234 sensor app processor 236, application processor 342, and AI processor 344, described below) may include, for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As used herein, memory may refer to any suitable storage medium such as disks, thumb drives, etc., both volatile and non-volatile. Examples of such media include RAM, ROM, EEPROM, SRAM, flash memory, or any other tangible or non-transitory medium that stores information that is accessible by a processor. Different embodiments may have components with differing capabilities, so long as the amount of RAM is sufficient to support reading sensor data and running analysis algorithms as described herein, and running all necessary supporting software.

FIG. 3 illustrates four phased arrays, labeled as elements 210-1, 210-2, 210-3, and 210-N, which make up an exemplary phased array system 210. These phased arrays are, in an exemplary embodiment, phased Doppler radar arrays that monitor an area within the environment. Although only four phased arrays are shown, it should be understood that each positional sensing device 10 can have any number of phase arrays, up to an arbitrary number "N" of arrays within the phased array system 210. The phased array system 210 can be configured to such that each element 210-1, 210-2, 210-3, etc. is spaced apart in regular intervals such that the pulses emitted by these elements superimpose to form beams that increase power radiated in desired directions and suppress radiation in undesired directions. In certain embodiments, the phase array system 210 can be implemented as a sparse phased array, in which certain phased array elements are omitted from the phased array system 210. For example, element 210-2 may be omitted such that the spacing between element 210-1 and element 210-3 is approximately twice the spacing between element 210-3 and 210-4. Sparse phased arrays may be used in order to reduce cost and/or energy requirements of the phased array system 210. As the beams transmitted from these phase arrays is reflected, the reflections are sensed by sensor 232. Sensor 232, in some embodiments, may be a Doppler radar sensor. Phased array sensor 230 may also include a positional processor 234 and a sensor app processor 236 that generate positional data from the sensed data and may perform a variety of processing, such as noise reduction. These processing elements may execute instructions stored in, and may variously read/write to, a memory 238, which may include a combination of temporary storage (for sensed data) and permanent storage (for operational software and the like).

Compute module 340 of server 20 generally handles the processing of data generated by the phased array sensor 230. In addition to the application processor 342, compute module 340 includes an AI processor 344 for analysis and classification of the positional data, and map processor 346 for storing map data associated with the environment of the positional sensing devices 10 and the respective positions of each positional sensing devices 10 within positional sensing system 1. The processors 342, 344, and 346 may respectively execute instructions, stored in, and read/write to, memories 343, 345, and 347, respectively, which may include a combination of temporary storage and permanent storage.

While the terms "positional sensor" and "positional sensing" are used in this disclosure, the devices 10 are not meant to be so limited, and other embodiments may exist where a device 10 uses sensing methods other than positional sensing to determine the movement of objects through a monitored space. For instance, in alternative embodiments, device 10 may have one or more other types of sensors capable of imaging or monitoring an area within an enclosed space, these sensors being used to in addition to or as an alternate to phased array sensor 230 and/or positional sensor. By way of example, in some embodiments, device 10 may utilize a LIDAR sensor and/or any other known type of sensor(s) so long as the sensor(s) are capable of fitting and operating within the device 10. The sensed data from these various sensors may in various embodiments be collected, additionally or alternatively to, the data from the phased array sensor 230. The general principles described herein are agnostic to the particular technique used to collect data about the monitored area. While embodiments may exist where device 10 does not collect (or is not limited to collecting) positional data or convert sensed positional data into trajectories of objects, an exemplary device may still be referred to herein as a "positional sensing device" for ease of explanation.

Positional sensing device 10 may additionally include a communication interface 256 with one or more interfaces for wireless communication (e.g., Wi-Fi or Bluetooth antennas) and/or a wired communication interface. In addition, the device may have a power supply 254 providing a physical connection to AC power or DC power (including power conversion circuitry). While FIG. 2 illustrates communication interface 256 and power supply 254 as two separate components, in exemplary embodiments, a single Power Over Ethernet (PoE) system 258 (e.g., PoE 802.3af-2003 or 802.3at-2009, though any appropriate standard may be used) may be used to provide both functions, the PoE system receiving electric power along with data through a physical interface, such as an RJ45 connector or similar. Device 10 is designed to be constantly powered, so as to always be in a ready state to recognize and capture event data, and therefore, the device relies primarily on a continuous power connection (PoE). However, in some embodiments, device 10 may have a battery (not specifically shown) to provide backup power, in the case of a power outage or mechanical failure of the PoE/power supply component. Device 10 may include a USB interface into which a peripheral (e.g., to provide Bluetooth or network connection or other functionality) may be inserted. In addition, the device may include one or more LEDs (not specifically shown) that indicate a power and/or functional status of the device. Communication through the communication interface 256 may be managed by the sensor app processor 236.

Similarly, as described with respect to positional sensing device 10, sever 20 can include a communications interface 356 and power supply 354. The communication interface 356 can include one or more interfaces for wireless communication (e.g., Wi-Fi or Bluetooth antennas) and/or a wired communication interface. Power supply 354 may provide a physical connection to AC power or DC power (including power conversion circuitry).

Device 10 may also include a variety of components configured to capture operation and/or telemetry data about the device 10. The device 10 may include one or more temperature sensors 251 capable of sensing an internal temperature and/or an internal humidity measurement of the device to ensure that such conditions are within functional bounds. In addition, the device 10 may include a clock component 252 that may be used to measure a time (timestamp) of data capture and may also be used in the scheduling of operations by the positional processor 234, e.g., reporting, resetting, and/or data capture operations. In an exemplary embodiment, a timestamp of data capture is collected with a high degree of specificity, typically a fraction of a second.

Similarly, as described with respect to positional sensing device 10, sever 20 can include a clock component 360 that may be used to measure a time (timestamp) of data capture and may also be used by the server when aggregating positional data received from one or more positional sensing devices 10 and determining trajectories of objects detected by the one or more positional sensing devices 10.

While FIG. 3 illustrates application processor 342, AI processor 344, and map processor 346 as being separate processing elements, in alternative embodiments, the functionalities of these processors may be implemented within a single processing element or distributed over several components. Similarly, positional processor 234 and sensor app processor 236 may be implemented as separate processors or within one or more processing elements, in any appropriate configuration. Processors 234, 236, 342, 344, and 346 may be respectively implemented by any type of suitable processor and may include hardware, software, memory, and circuitry (or any combination thereof). In one embodiment, these processors may be implemented as two logical parts on a single chip, such as a custom ASIC or field-programmed gate array (FPGA). In one exemplary implementation, positional processor 234 is a Doppler ASIC, while the remaining processors are implemented as one or more CPUs. In some embodiments, application processor 342 is a High-Level OS processor (e.g., Linux). Other configurations are possible in other embodiments. Positional sensing device 10 may have other types of suitable processor(s) and may include hardware, software, memory, and circuitry (or any combination thereof) as is necessary to perform and control the functions of positional sensing device 10. In some embodiments, positional sensing device 10 may have multiple independent processing units, for example a multi-core processor or other similar component.

As described above, device 10 can be installed at regular intervals throughout the environment such that the field of view 40 of the devices 10 in aggregate cover all or nearly all the desired area to be monitored, although in some embodiments, device 10 can be placed at irregular intervals so long as at least one device 10 has a field of view 40 that covers the desired area to be monitored. Each device 10 can include a phased array system 210, which can be a Doppler array, and a phased array sensor 230. The phased array sensor 230 is configured to detect pulses that are reflected off the environment and objects, such as humans, moving throughout the environment. Using the reflected pulses, the positional processor 234 can determine, for each point in time, phase data identifying features of objects within the environment.

The sensor 232 passes its collected data to positional processor 234. Positional processor 234 uses Doppler technology to measure, from the collected data, the phase shift and/or the amplitude change of modulated Doppler pulses reflected from the object back to the sensor 232. The process from generating pulses to the generation of positional data is referred to herein as the data capture, the data capture process resulting from a single frame of data. Scheduling of a data capture is controlled by the positional processor 234. Once the positional processor 234 initiates a data capture and the Doppler pulse is reflected back to the sensor 232, the positional processor 234 collects the captured data from the sensor, correlates the collected data to the timing of the capture (with reference to clock 252), and calculates the positional data. As described above, in certain embodiments, when the amplitude change indicates that an object is smaller than a predetermined threshold (e.g., when the amplitude change is sufficiently large), the phase shift data for the small object may be filtered out before the positional data is calculated. The positional data will then be transmitted to the compute module 340, which aggregates positional data from each positional sensing device 10 for detected objects throughout the entire environment being monitored. While, in the exemplary embodiment of FIG. 3, the hardware of the positional processor 234 performs the positional data calculations, other embodiments may offload such computation to a dedicated processor or chip (not shown), or to server 20.

Sensor app processor 236 may be, in one embodiment, implemented as a microprocessor. The sensor app processor 236 performs a variety of tasks in support of the depth processor 234 as well as the entire device 10. Initially, the sensor app processor may control power management and firmware/software management (e.g., firmware updates). In addition, sensor app processor 236 may convert the phase data generated by the positional processor 234 so that it may be further processed in the compute module 340. For instance, the Doppler data (phase data) transmitted from the depth processor may be converted from a low-voltage differential signal (LVDS) to a wireless signal or USB signal, and additional processing may be done to, e.g., reduce noise in the data. The sensor app processor 236 may also be configured to transmit the positional data generated based on the phase data to the compute module 340 for further processing.

In some embodiments, the sensor app processor 236 may control management of the environmental conditions of the device 10, to ensure that the temperature and power conditions of the device are within the boundaries of acceptable limitations. Temperature sensor(s) 251 may be used to measure ambient and operating temperatures. In an exemplary embodiment, the operating temperatures may range, e.g., from approximately 0° C. to 35° C. (ambient), 0° C. to 60° C. (maximum at enclosure case), 0° C. to 85° C. (internal), and −10° C. to 85° C. (storage), though other ranges may be possible in other embodiments. Similarly, humidity conditions may range, in one embodiment, from approximately 5% to 95% non-condensing and from 20% to 80% non-condensing at minimum.

The positional data and associated timestamp data is sent by the sensor app processor 236 to the compute module 340, and particularly, to an application processor 342. Compute module 340 may include application processor 342, AI processor 344, and map processor 346. In general, compute module converts the positional data to a cluster of points associated with a features of an object, herein referred to as "point cloud data." For example, the point cloud data could be associated with the motion of an arm while a human subject is sitting within a chair, or the motion of the legs or torso of a human as the human walks through the environment. Points that appear close in coordinate (X, Y) space and in time can be associated with the same point cloud. Point clouds can be understood to be associated with a particular object (e.g., human) moving throughout the environment. Rather than continuous capture (as a video or timed image capture would do), the phase data may be captured asynchronously by sensor 232 as objects are sensed. Put another way, only "movement data" of the person or object is tracked. While different frame rates and/or resolutions may be used in different embodiments, it will be generally understood that the frame rate should be fast enough to allow tracking of a person or object, rather than a single frame in which their direction of movement cannot be determined. Alternatively, in some embodiments, data streamed from the sensor to the application processor 342 can take the form of a 3-D point cloud with a time integration component, such that the 3-D point cloud is streamed over time. The streamed point cloud data may be considered cumulatively, with a time constant for integration of data across frames or subframes. Data streamed to the AI processor 344 for classification may include a point cloud stream along with Doppler data and/or other signs of life metrics. The AI processor can implement an AI-model based on one or more sets of point cloud image training data. The output of the AI processor 344 may, in one embodiment, be is fused with output from a Bayesian inference engine by a Kahlman filter.

Compute module 340 can aggregate point cloud data from each positional sensing device 10 in order to determine positions of objects for a given point in time, as indicated by the timestamp data. As objects move throughout the environment, compute module 340 can utilize AI algorithms that determine the trajectory of each object by connecting point clouds together over time (e.g., for each collection of point cloud data associated with a respective timestamp), which may be referred to herein as determining a trajectory for an object. For example, the compute module 340 can utilize one or more reward functions that can determine which point clouds across different timestamps are associated with a particular object. In some embodiments, a first reward functions can be configured to connect point clouds that are moving over time (e.g., a walking person) and a second reward function can be configured to connect point clouds that remain relatively stationary over time (e.g., a person sitting down at a desk). The process of connecting point cloud data together will be discussed in more detail with respect to FIGS. 7A-7B, below. Compute module 340 can also use the determined trajectories to determine count data that represents the number of people within a given area or space being monitored within the environment (e.g., such as a specific room, a collection of rooms, or a predefined area of interest). This data retains anonymity of identity, as it is not personally identifiable to any person, and instead, directed merely to their movement into or out of a space.

Application processor 342 receives the positional data of the monitored area from the sensor app processor 236 and converts that data to point cloud data. The conversion of positional data to point cloud data may be done through any known calculation. Application processor 342 then sends that generated point cloud data to the AI processor 344. The AI processor 344 algorithmically discerns people, and their direction of movement, from other objects in the depth data. In one embodiment, the AI processor uses an on-board machine learning algorithm to classify objects within a frame as human. By combining different clusters of points, each with respective heights, AI processor 344 is able to identify the shape of a detected object and can classify these objects as people. In one embodiment, the algorithm implemented by the AI processor may recognize a cluster of points as a head, or shoulders. By tracking the movement of that group of pixels within a sequence of frames, the AI processor may track the position of the human subject. In other embodiments, the AI processor may be additionally or alternately capable of identifying other objects, such as animals, objects, furniture or barriers, or other organic and non-organic movement. The AI processor 344 also includes logic for connecting point clouds together over time into a trajectory for a detected moving object. In some examples the AI processor 344 can include a first reward functions that can be configured to connect point clouds that are moving over time (e.g., a walking person) and a second reward function can be configured to connect point clouds that remain relatively stationary over time (e.g., a person sitting down at a desk). As such, the AI processor 344 is able to determine when an object remains relatively stationary for long periods of time within a monitored area, and the same object transitions to moving across the monitored area by using both the first reward function for detecting moving objects and the second reward function for detecting relatively stationary objects.

In the exemplary embodiment, the identification of humans is performed on top of the generated point cloud data, and is not based on image classification from an optical camera (e.g., facial recognition), thermal camera, or other similar means. However, in alternative embodiments, data from optical/thermal cameras, RFID, other sensors, and/or other techniques for detecting humans may be considered in addition to, or alternate to, the depth data in the identification of people. In some embodiments, the AI processor 344 improves the point cloud data before classification, for example by processing the point cloud data to improve the signal to noise ratio. In other embodiments, these activities may be performed by the application processor 342, or not at all. In some embodiments, the classification of objects is split between the application processor 342 and the AI processor 344. This may be most useful in embodiments where one of the processors is configured to be particularly efficient at a certain type of task. As one example, AI processor 344 may be structured to expediently perform matrix multiplication, while application processor 342 may expediently perform tracking of a shape. The strengths of the relative components of compute module 340 are therefore exploited through distribution of processing to enhance the speed of computation and reduce latency in generating count data. Because the phase data, positional data, and point cloud data do not reveal the identity of people being monitored, no personally-identifiable data is captured or stored by the positional sensing system 1.

Although the present embodiment described utilizes the sensor arrangement described in FIG. 3 (e.g., Doppler radar), it should be understood that various other sensing means can be utilized to generate positional and occupancy data. In various embodiments other sensing technologies, such as optical sensors, thermal image sensors, LIDAR sensors, impulse-radio ultra-wideband (IR-UWB) sensor, and various other types of radar such as frequency modulated continuous wave (FMCW) radar.

The positional data generated by the AI processor 344 is aggregated for each positional sensing device 10 by the map processor 346, which stores a map 400 (discussed below) which includes data regarding the XY coordinate position of each positional sensing device 10, as well as features within the environment, such as objects that may occlude a tracked object from being monitored by a respective positional sensing device 10. The positional data may be correlated to XY coordinates which are associated with the map 400 stored by the processor 346. Additionally, features stored in map 400 may be utilized in order to filter out spurious positional data, for example when a positional sensor incorrectly detects an object that is attributable to a reflection of a pulse from an occluding wall (as described in more detail with respect to FIGS. 5 and 6). In an environment utilizing multiple positional sensing devices 10, map processor 346 may be configured to aggregate and reconcile data collected from each of the multiple positional sensing devices. That is, for an environment with multiple positional sensing devices 10, the server 20 will consolidate information from the multiple positional sensing devices 10 to generate aggregated positional data that accurately identifies each object within the monitored area. This aggregation and reconciliation is performed by map processor 346 at the remote server 20. It is generally noted that while the server 20 is referred to as a "remote" server, the functions of the server 20 need not necessarily be performed on a system physically remote to the device 10. Rather, in alternative embodiments, the functions described herein with regard to the server 20 may be performed locally by one or more devices 10 or by another device within a local network that includes one or more devices 10.

In some embodiments, remote server 20 may contain logic to analyze point cloud data at various granularities of space. This concept may be understood as a virtual space —a digital representation of a physical space—with different virtual spaces existing within a hierarchy of perception. To illustrate, trajectories of objects or people within any of a number of geographic spaces may be determined, such as a campus, a building, a floor, a room, or a cubicle, each subsequent space being a subset of the larger physical space before it so as to fit within in. Additionally, based on the determined trajectories, an account occupancy count for each defined virtual space can be determined. A virtual space may be defined for each of these physical spaces, creating a set of "nested" virtual spaces. A user (such as a business owner) interested in tracking occupancy and trajectories through any or all of those geographical spaces may then be able to access real-time data thereof by selecting the corresponding virtual space, after which the trajectories of objects and associated timestamp is displayed/transmitted. If desired, the user may also display the occupancy count for a given virtual space in a similar manner. Similarly, in addition to particular physical spaces, remote server 20 may contain logic to generate occupancy and trajectory data within defined logical spaces, such as an organizational grouping of offices/cubicles (e.g., a department or team space), or a subset of rooms not necessarily contiguous or located within a single physical space. In one embodiment, the data is distributed by the remote server 20 via an API so as to be accessible from a mobile or other computing device 25. Any given device 10 is typically not aware of any grouping or classification it may belong to, and meaningful grouping of any of devices 10 may be performed by the remote server 20.

The aggregated count data and/or trajectory data may be presented, with low latency (e.g., typically less than a few seconds latency), to a user via an API so as to be accessible via an application, software, or other user interface. The information may be presented to a user interface at various hierarchical slices of virtual spaces. In some embodiments, a user of device 25 or third party server 35 may request, from server 20, aggregated count data for a particular virtual space for a defined period of time (e.g., one day, one week, one month) and may receive, in response, an interface displaying a total count for the defined period of time. Similarly, a user of device 25 or third party server 35 may request, from server 20, trajectory data for a particular virtual space for a defined period of time (e.g., one day, one week, one month) and may receive, in response, an interface displaying a total each identified object and its associated trajectory for the defined period of time (for example, as shown in FIG. 7A-7B and FIGS. 10-19).

In some embodiments, the user may obtain from the server trending or hierarchical people count statistics. For example, a user may be able to access a trend of occupancy data over the course of a day on an hourly basis. In one embodiment, the server 20 may have one or more repositories of historical occupancy data collected for one or more devices 10 from which analysis and/or reporting may be done in response to a user request.

Remote server 20 may in some embodiments communicate bi-directionally with one or more devices 10. For instance, remote server 20 may receive periodic updates from a device 10 with status information, such as a MAC address (or other network information) or other information regarding the devices' health and connectivity. The remote server 20 may respond thereto, and may also be capable of querying a device 10 as to that same type of data, or providing operational instructions such as, e.g., instructions to reboot, to update its software, or perform network commissioning process (e.g., blink a light or communicate its network information via Bluetooth or wireless communication), or to kick off/stop data capture operation.

As described above, data capture can be performed asynchronously, with event data being captured and processed at cyclical or irregular times. For instance, in retail establishments, there may be little or no data captured after closing hours of the business or when the doors are locked. As a result, there may be predictable times of day at which time the computing capabilities of the device 10 are expected to be unused or underutilized. In this regard, application processor 342, AI processor 344, and map processor 346 may only have processing tasks to perform when phase data is being captured by the sensor 232. Accordingly, in one embodiment, spare computing resources of the device 10 and server 20 are identified, and during periods of relative inactivity, the spare computing resources are used for tasks unrelated to the capture and processing of depth data. For example, the spare computing resources of application processor 342, AI processor 344, and map processor 346 may be used as additional compute for training of the machine learning elements of the AI processor 344, or the update of related algorithms and/or software/firmware. Additionally, spare resources may be used for wholly unrelated tasks to serve the needs of other devices connected to the wireless network. In support of these functions, cached data may be stored, for example, in any of memories 343, 345, and 347. By these means, all components of positional sensing system 1 are network-enabled and may be taken together or separately to act as a data center. This may reduce bandwidth and latency requirements for other devices, and may improve security where data processing performed by devices other than the positional sensing devices 10 and server 20 should be restricted to a premise on which device 10 is located.

In some embodiments, in addition to the phase data, the sensor app processor 236 may also transmit telemetry data to the application processor 342, including, e.g., temperature data, CPU/memory/disk status, commands executed, and the like. In some embodiments, the telemetry data is typically sent at periodic intervals (e.g., every 10 seconds), however, in other embodiments, it may be sent only upon request from the server 20, or with every instance of data capture.

Figure 4:
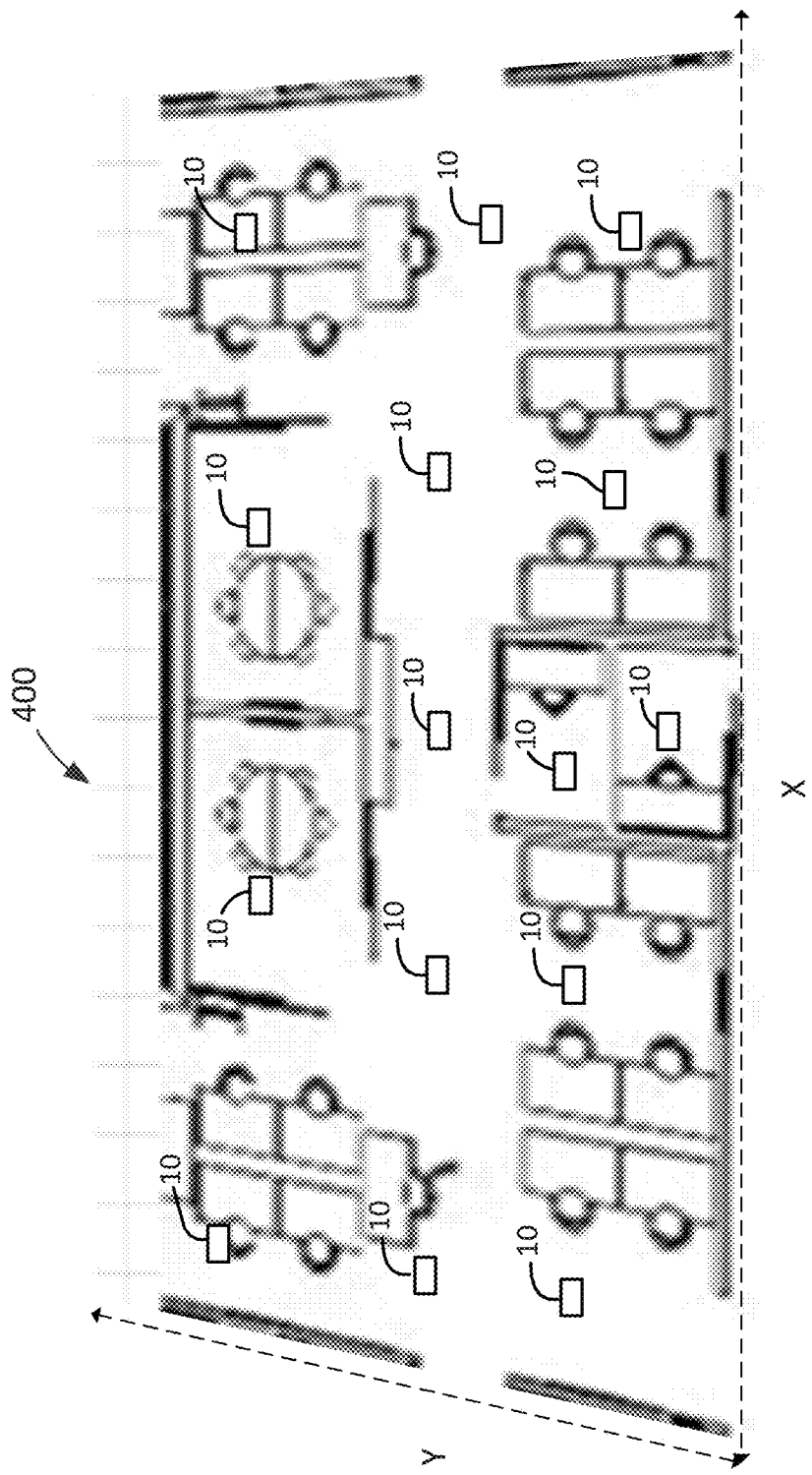
FIG. 4 depicts a stored map and positions of a plurality of positional sensing devices, in accordance with some embodiments of the present disclosure.

FIG. 4 depicts a stored map 400 and positions of a plurality of positional sensing devices, in accordance with some embodiments of the present disclosure. The primary function of device 10 is to monitor the positions of people as they travel though the environment being monitored. This includes the ability to determine directionality of movement, differentiate between multiple moving objects and correctly determine trajectories of each object, and to disregard non-human subjects, such as animals, objects, door swings, shadows, and the like. The margin of error in performing these tasks should be relatively low. In some embodiments, the margin of error may be less than 1%. As shown in FIG. 4, stored map 400 may represent the environment which the position sensing system 1 is configured to monitor. The map 400 may include data including the position (e.g., using X, Y coordinates) of features of the environment, such as doors, walls, and other objects that may occlude the monitored area of one or more positional sensing devices 10. In some embodiments, map 400 can comprise a floor plan. Additionally, the map 400 may include positional data (e.g., X, Y coordinates) for each positional sensing device 10. Using the coordinates of each positional sensing device 10 stored in map 400, the server 20 may aggregate the positional data captured by each positional sensing device 10 to track objects that move between the field of view of various positional sensing devices 10. Additionally, server 20 may be configured to identify the position and trajectory of an object even when it is occluded from a positional sensing device 10 by a feature of the environment by utilizing data captured from an adjacent positional sensing device 10 and/or the data stored on map 400. For example, if an adjacent positional sensing device 10 has an overlapping field of view that captures the object, the server 20 can continue to identify the position and trajectory of such an object as it passes the occluding feature. In some embodiments, even when no positional sensing device 10 can detect an object being an occluding feature, the server can use AI techniques to inference the position and trajectory of the object using the stored position of the occluding feature within map 400 and by using a reward function to connect the position and trajectory of the object prior to becoming occluded and after the object is no longer occluded by the feature. Similarly, data stored in map 400 can be used to filter out spurious signals. For example, map 400 can store the position of walls within the environment, and if a respective positional sensor identifies an object that is beyond an occluding wall, such data can be ignored (e.g., filtered out) by server 20 when aggregating and clustering positional data from the various positional sensing devices 10.

Figure 5:
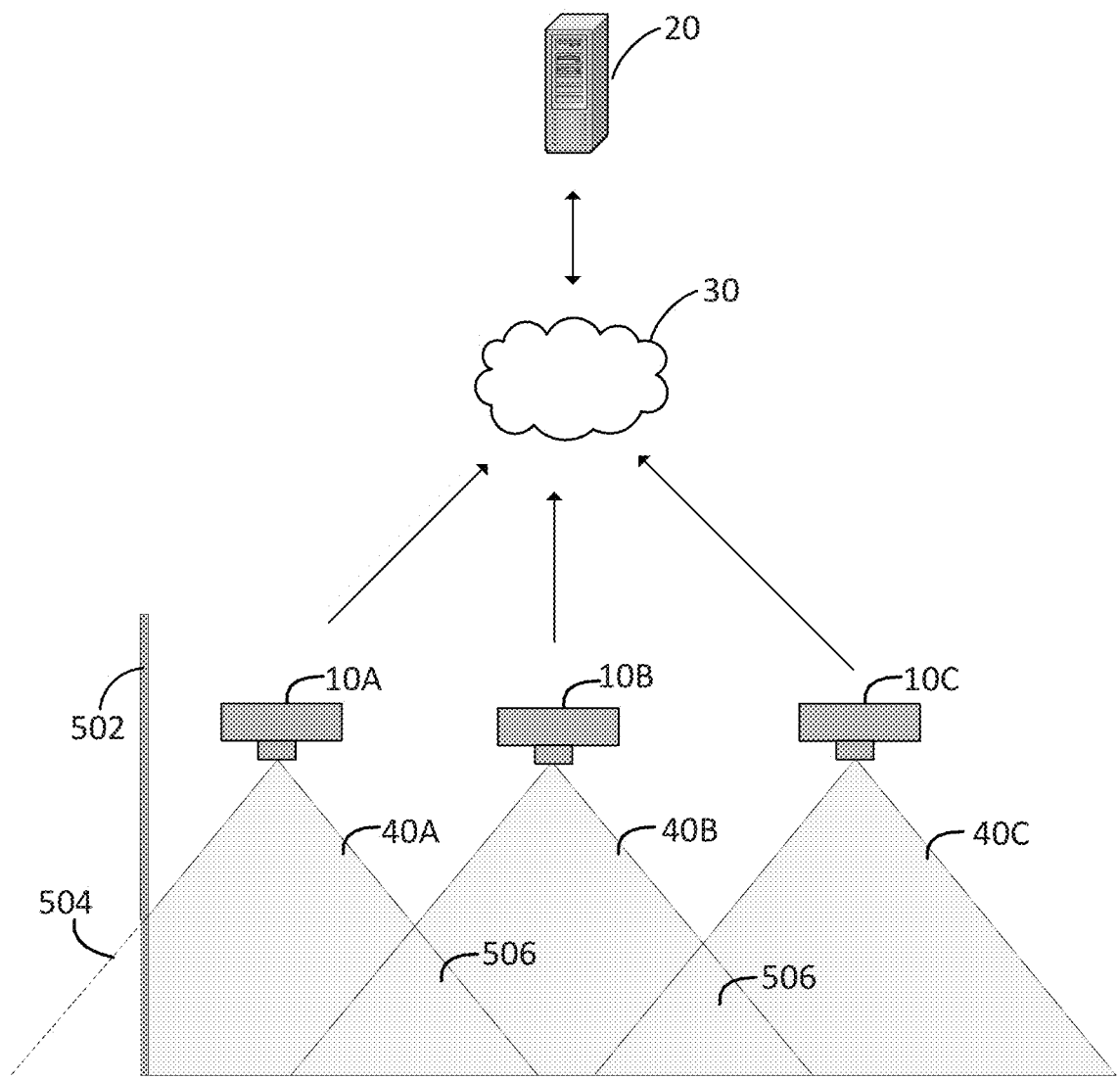
FIG. 5 depicts a plurality of positional sensing devices in which at least a portion of the monitored area is occluded, in accordance with some embodiments of the present disclosure.

FIG. 5 depicts a plurality of positional sensing devices 10 in which at least a portion of the monitored area is occluded, in accordance with some embodiments of the present disclosure. As shown, positional sensing devices 10A, 10B, and 10C are deployed to monitor an area and having respective field of views 40A, 40B, and 40C. An occluding wall 502 partially occludes field of view 40A of positional sensor 10A. Note that Field of view 40A and field of view 40B have an overlapping area 506. Similarly, field of view 40B and field of view 40C have a similar overlapping area 506. Each of the positional sensing devices 10 are connected to server 20 via network 30. In the case that positional sensor device 10A generates positional data that indicates a position within occluding area 504, the server 20 may filter out such positional data. Positional data may be transmitted to sever 20 with included XY coordinates, which can be cross referenced with coordinates of occluding feature 502 stored by map processor 346. If map processor 346 determines that the XY coordinates of the occluding feature is located between the XY coordinates of the positional sensing device 10A and the XY coordinates associated with the positional data, the map processor 346 may determine that such positional data is spurious and may filter it out from the aggregated positional data. In other words, such positional data may not be used to determine aggregated positional data of all monitored objects within the environment.

Figure 6:
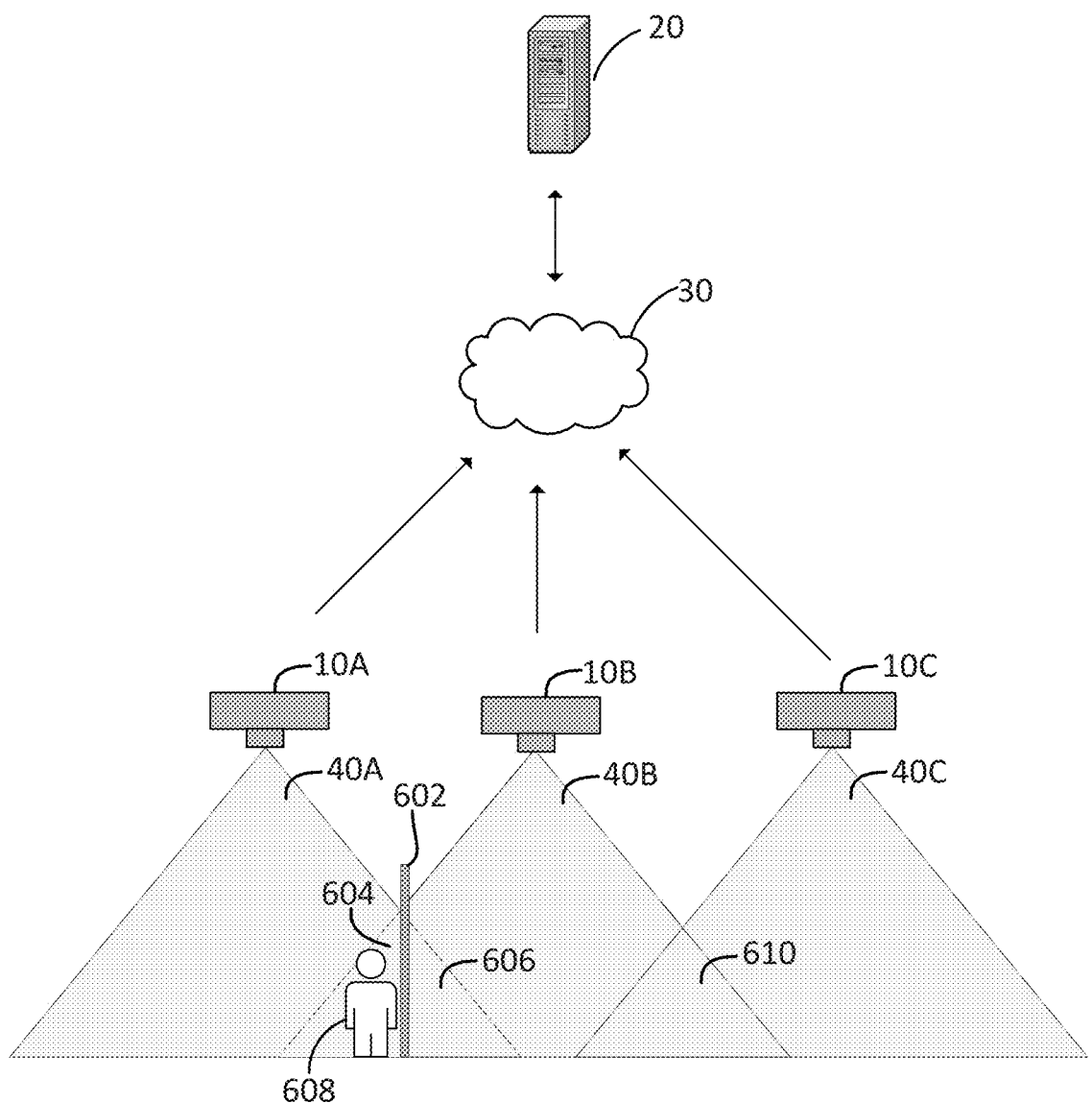
FIG. 6 depicts a plurality of positional sensing devices in which at least a portion of the monitored area is occluded from a first positional sensing device, but not a second positional sensing device, in accordance with some embodiments of the present disclosure.

FIG. 6 depicts a plurality of positional sensing devices in which at least a portion of the monitored area is occluded from a first positional sensing device, but not a second positional sensing device, in accordance with some embodiments of the present disclosure. As shown, positional sensing devices 10A, 10B, and 10C are deployed to monitor an area and having respective field of views 40A, 40B, and 40C. An occluding feature 602 partially occludes field of view 40A of positional sensor 10A and field of view 40B of positional sensor 10B. Within the overlapping area between field of view 40A and 40B, there is a partially occluded area 604 which is not hidden from field of view 40A but is hidden from field of view 40B. Conversely, partially occluded area 606 is not hidden from field of view 40B but is hidden from field of view 40A. In one example, a person 608 can be positioned within partially occluded area 604 such that person 608 is visible to positional sensor 10A, but not positional sensor 10B. Accordingly, positional data associated with person 608 can be measured by positional sensing device 10A and person 608 can be tracked even though positional sensor 10B is occluded from observing person 608. In another example, map data 400 stored by map processor 346 can be used to enhance positional data determined by one or more positional sensing device 10. Map 400 can include XY coordinates for doorways between a first room and a second room of a monitored environment. Should positional data be generated that shows person 608 moving between the first and second room, but not through a doorway, the map processor 346 may adjust the XY coordinates associated with the positional data of person 608 such that person 608 is determined to be moving between the first room and the second room through XY coordinates associated with the doorway stored by map processor 346.

Figure 7A:
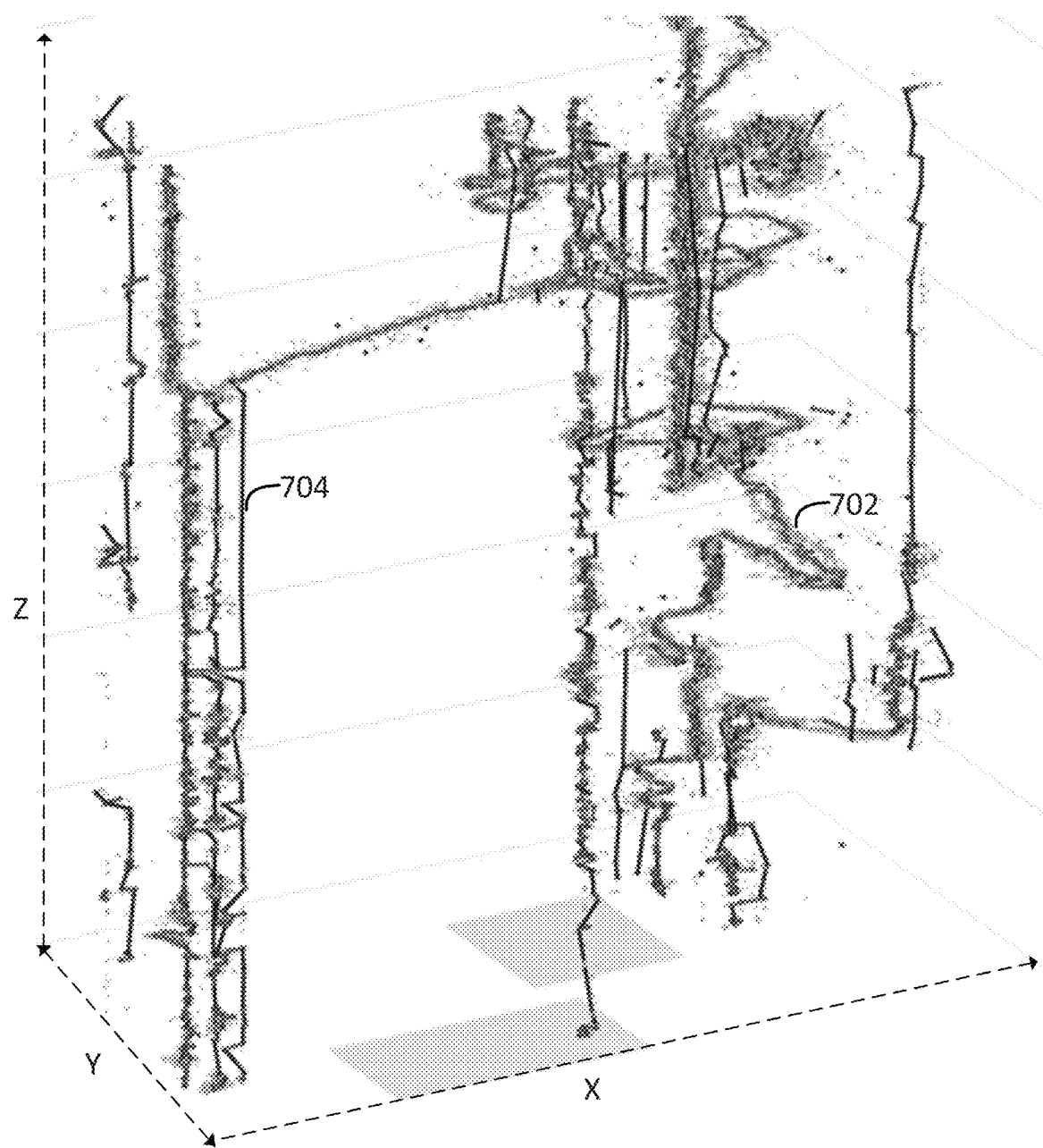
FIG. 7A depicts exemplary tracking data generated by the positional sensing system, in accordance with some embodiments of the present disclosure.

FIG. 7A depicts exemplary tracking data generated by the positional sensing system, in accordance with some embodiments of the present disclosure. FIG. 7A depicts an XYZ coordinate system that includes positional data over time for objects monitored by the positional sensor system 1. The X and Y axes correlate to XY coordinates stored as part of map 400 associated with the area being monitored. The Z axis represents time, such that the XYZ coordinate system shows the change in position of objects being monitored over time.

Positional data from the positional sensing devices 10 is aggregated by the compute module 340 of sever 20. For each timestamp, the compute module 340 determines whether a positional data along the Z axis is associated with the same object. Compute module 340 utilizes a first algorithm (e.g., a reward function) to connect point clouds together that are associated with a respective object to form tracklets 702. Tracklets 702 are associated with a respective object (e.g., a person) moving throughout the monitored environment. For example, the tracklet 702 represents an object (person) moving along the Y dimension over time, as measured by the Z axis. The first reward function can be optimized to identify moving objects. For example, the first reward function can be configured to identify point clouds having a threshold number of associated points. It should be understood that point clouds include more associated points when the monitored object is in motion. Therefore, the first reward function can be configured to identify point clouds of a sufficient size, which are correlated to objects in motion.

However, in certain situations, a monitored person may temporarily cease moving. For example, a person may travel to a conference room and subsequently take a seat within the conference room for a meeting. After a specified time sitting, the same person may stand and leave the conference room for another location within the environment. The first reward function that is optimized to identify point clouds with more than a threshold number of points may not be effective in monitoring the position of a relatively stationary person, such as a person sitting down in a conference room. Accordingly, compute module 340 may utilize a second algorithm (e.g., reward function) which may be optimized to identify relatively stationary objects. The second reward function may be optimized for point clouds with less than a threshold number of points within the point cloud, which represents objects that are associated with little to no movement. For example, phased array sensor may only detect small movements of a person's arms while the person remains sitting/relatively stationary, and the second reward function may be optimized to detect such small movements which are correlated to point clouds having less than a threshold number of points. Lines 704 can represent objects identified by the second reward function. As shown in FIG. 7A, lines 704 can connect tracklets 702 thereby forming full trajectories for each detected object within the monitored area over time. It should be understood that the second algorithm (e.g., reward function) is also configured to connect tracklets when there are no detected points within the point cloud. For example, a person seated still and standing in place with little to no movement may result in no positional data being generated corresponding to the position and trajectory of that person. The second reward function can connect tracklets associated with a respective object generated by the first reward function even when separated by periods of no positional data being detected for the non-moving object.

FIG. 7B shows three individuals 710A, 710B, and 710C within an enclosed area that is being monitored by one or more positional sensors 10 (and, optionally, a depth sensor 11 at the threshold). In the present example, the one or more positional sensors 10 detect point clouds 706 that are each attributable to three distinct individuals 710A-710C. For each individual 710, a tracklet 702 is determined which tracks the trajectory of each individual 710 throughout the room. As shown, individual 710A is seen walking from the entryway towards a chair opposite individuals 710B and 710C along trajectory (tracklet) 702A. In contrast, individuals 710B and 710C are seen in a sitting position, and therefore their associated tracklets 702B and 702C are relatively short indicating very little motion. Despite their sitting position, the second reward function (described above with respect to FIG. 7A) is capable of identifying the small motions (e.g., arm motions, leaning of torsos, etc.) made by individuals 702B and 702C in their sitting positions. It should be noted that point clouds 706 detected by the positional sensing devices 10 and/or depth sensing devices 11 can detect point clouds 706 with corresponding (x,y,z) coordinates where (x,y) indicate the relative position of the point cloud 706 within a 2D dimensional floor plan and (z) indicates the relative height of the point cloud 706 above the 2D dimensional floor plan. In certain embodiments, the positional sensing system 1 is configured to "flatten" the (x,y,z) coordinates into (x,y) coordinates, for example when the floor plan does not have elevation changes, such as ramps or staircases.

In some embodiments, the positional sensing system 1 can be configured to track and store additional statistics related to occupancy of a given space. In this regard, the one or more positional sensing devices 10 and/or depth sensing devices 11 can track the number of individuals 710 within a space, and the amount of time each individual spends within the space. This statistic can be determined by tracking tracklets 702 for a given individual 710 within a given space and determining the amount of time the tracklet 702 for a given individual 710 remains within the space. In some embodiments, the positional sensing system 1 can additionally utilize depth sensing devices 11 placed at thresholds to enclosed spaces to determine total occupancy count within a space in addition to, or in place of positional sensing devices 10. The measurement of how long a number of tracklets 702 (associated with distinct individuals 710) remain within a given space/room will be referred to as person-minutes. Person minutes is an aggregated statistic that is stored by the positional sensing system 1 (e.g., via one of memories 343, 345, and/or 347, as discussed with respect to FIG. 3) which tracks the number of tracklets 702 within a given space and the number of minutes each tracklet 702 remains within the given space. For example, if individual 710A has an associated tracklet 702A has a trajectory remaining within the space for 10 minutes, individual 710B has an associated tracklet 702B that has a trajectory remaining within the space for 20 minutes, and individual 710C has an associated tracklet 702C for 30 minutes, the positional sensing system 1 can determine that the given area or space has 60 person minutes of use. Stored person minutes statistics can be provided to one or more devices 25 and/or third party servers 35 via an API function for any given being tracked by positional sensing system 1. In addition, person minute statistics may be used by positional sensing system 1 to determine when certain areas should be cleaned based on an amount of use the area has received, as will be described in more detail below with respect to FIGS. 16-19.

Figure 8:
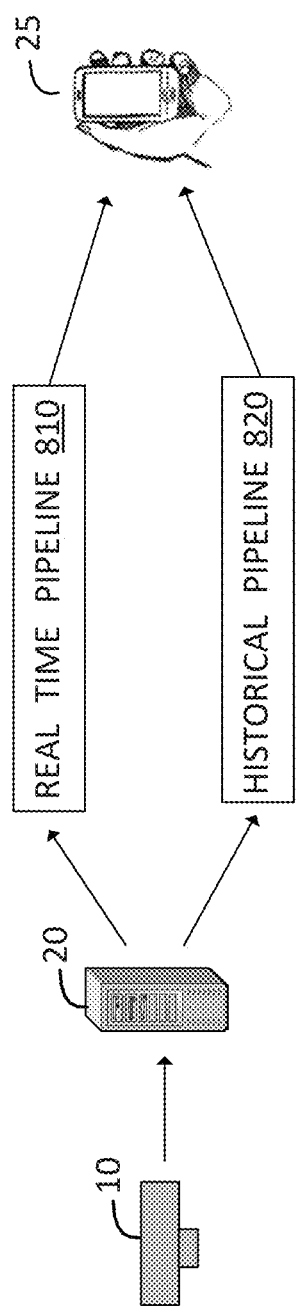
FIG. 8 depicts data flow for generating tracking data by the positional sensing system, in accordance with some embodiments of the present disclosure.

FIG. 8 depicts data flow for generating tracking data by the positional sensing system, in accordance with some embodiments of the present disclosure. As shown, server 20 may be configured to generate tracking data using either real time pipeline 810 or historical pipeline 820. Real time pipeline 810 allows for a user of device 25 to request real time tracking data collected from the positional sensing devices 10 in substantially real time. As used herein, substantially real time means approximately 5 minutes or less after the data is being collected, the tracking data becomes available for review and can be transmitted to the device 25 via an API request to the server 20. The real time pipeline 810 may not provide tracking data that is as accurate as the data that can be provided via historical pipeline 820. In some embodiments, real time pipeline 810 may utilize the first reward function but not the second reward function in order to provide tracking (e.g., positional data over time) data in substantially real time at the cost of being less optimized to connect tracklets for a respective object when separated by periods of the object having relatively little to no motion.

In an exemplary embodiment, tracking data from historical pipeline 820 can become available to be transmitted to device 25 approximately 1 hour after being collected. In another example embodiment, the tracking data from historical pipeline 820 can become available to device 25 approximately 24 hours after being collected. In contrast to tracking data generated as part of real time pipeline 810, tracking data that is generated as part of historical pipeline 820 can have improved accuracy, because positional data is chunked into discrete time portions. Accordingly, the positional data associated with any given time portion can be compared to an immediately previous time portion and immediately subsequent time portion, and compute module 340 may utilize one or more algorithms to efficiently match the positions of identified objects such that their trajectories are continuous over the chunked time portions. In this manner, tracking data generated via the historical pipeline 820 can have a greater accuracy than the tracking data generated by the real time pipeline 810, at the sacrifice of being delayed in its availability to be transmitted to a device 25 for review by a user of the positional sensing system 1. In some embodiments, historical pipeline 820 can utilize both first reward function for tracking moving objects and second reward function for tracking relatively static objects, which increases the accuracy of the historical pipeline 820 with respect to real time pipeline 810. For example, the historical pipeline 820 is able to detect an object (e.g., a person) enter a space clearly and then at a later time detect the object leaving the space. The historical pipeline 820 can connect the tracklets for the object across the time the object remained relatively static in the space with a high confidence even though there is little to no positional data for that object during the time the object remains relatively static.

Figure 9A:
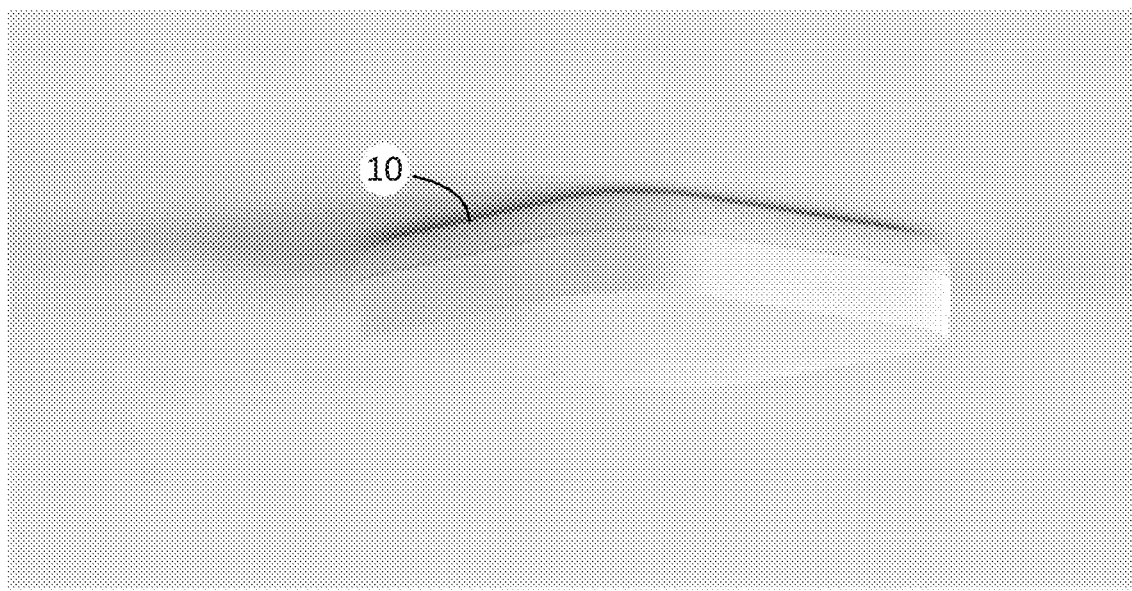
FIG. 9A is a diagram of a positional sensing device in accordance with some embodiments of the present disclosure.
Figure 9B:
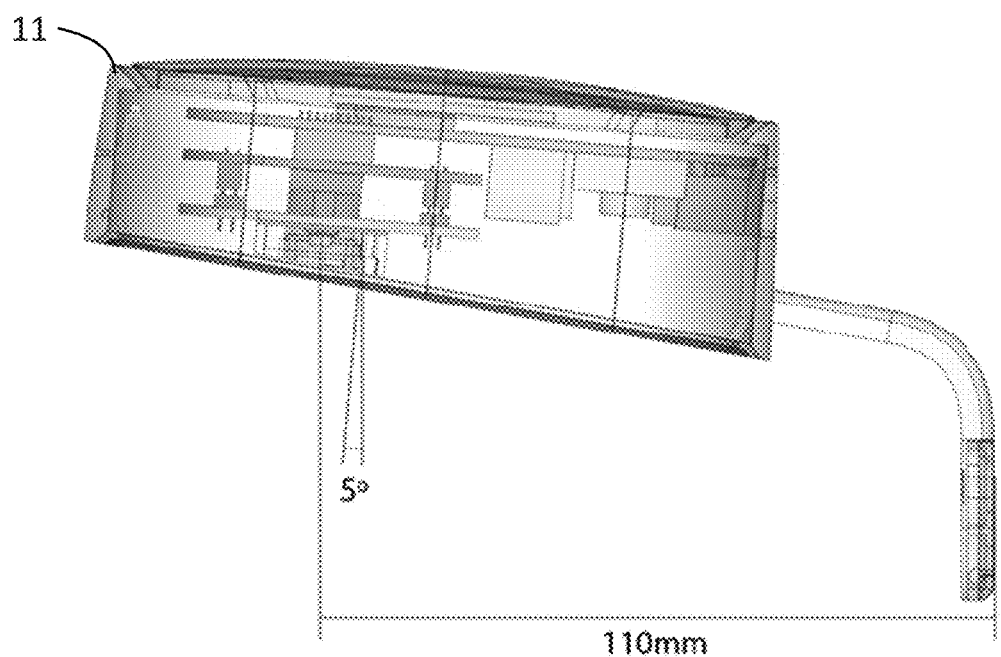
FIG. 9B is a diagram of a depth sensing device in accordance with some embodiments of the present disclosure.

FIG. 9A is a diagram of a positional sensing device 10 and FIG. 9B is a diagram of a depth sensing device 11. In contrast with depth sensing device 11, positional sensing device 10 may be positioned on a ceiling surface parallel to the ceiling surface. In some embodiments, depth sensing device 11 can be configured to be positioned at an angle relative to the wall against which the depth sensing device 11 is mounted, e.g., at a 5° angle or a value approximate thereto, though other angles may be used as appropriate. In contrast to the positional sensing device 10, depth sensing device 11 can be placed on a wall surface approximate an entryway or threshold. In some embodiments, the depth sensing device can be placed at a distance of at least 110 mm from the wall, although other distances are possible in other embodiments. Depth sensing device 11 can have the same functionality as was described with respect to positional sensing device 10 in FIG. 3. In contrast to positional sensing device 10, depth sensing device 11 can be placed above thresholds, such as doors, entryways, etc., and can be configured to determine whether a person has crossed the threshold and the direction in which the person has passed. Depth sensing devices 11 can be placed at each threshold for a given building, floorplan, bathroom, etc. and can be used to determine occupancy in a given enclosed space.

Figure 10:
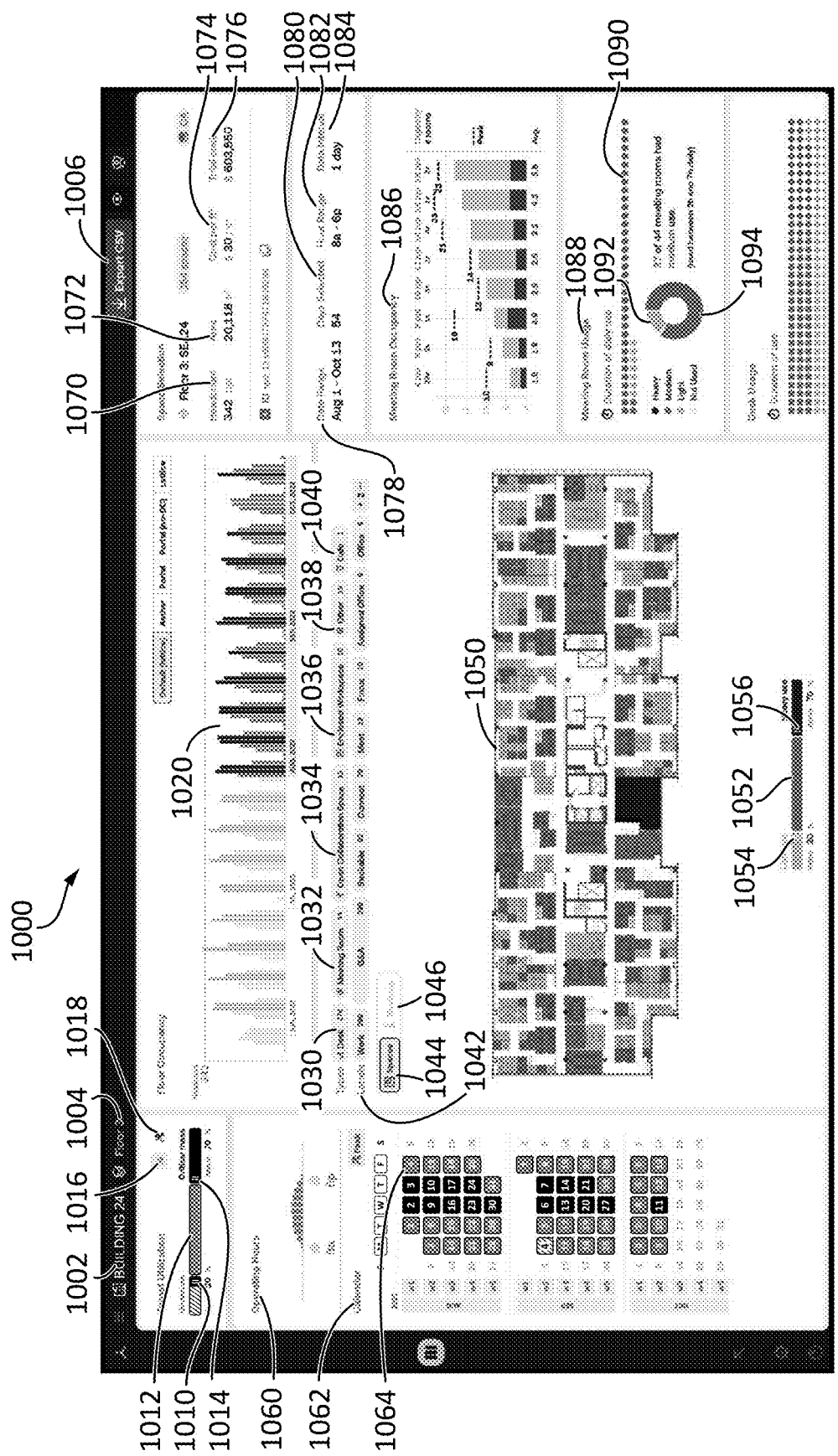
FIG. 10 depicts an exemplary graphical user interface displaying floor occupancy data determined by the positional sensing system, in accordance with some embodiments of the present disclosure.

FIG. 10 depicts an exemplary graphical user interface 1000 that displays floor occupancy data determined by the positional sensing system 1. A user of a device 25 (e.g., a mobile device, laptop, PC, tablet, etc.) may access the graphical user interface 1000 that is based on data generated by positional sensing system 1. In this regard, graphical user interface 1000 shows a floor plan 1050 in which the positional sensing system 1 is deployed. In the top corner, graphical user interface 1000 indicates the building number 1002 and floor number 1004 that is related to the floor plan 1050 that is being displayed. A user of graphical user interface 1000 can quickly and efficiently assess various aspects of the occupancy throughout various areas of the floor plan 1050. A user can quickly select a time window 1020 and contextual information presented in the graphical user interface 1000 will adjust to show values for the selected time window 1020. Based on the selected time window 1020, the date range 1078 and days selected 1080 will automatically populate. In the exemplary embodiment shown in FIG. 10, the data interval 1084 is one day, but in other embodiments the data interval can in any other unit of time, for example, by the second (e.g., real time), by the minute, by the hour, by the day, by the week, by the month, etc., as desired by the user of the positional sensing system 1.

Further, target utilization toolbar 1012 indicates to a user the target utilization rate of areas of the floorplan on a contextual basis. When no "type" or 1030-1040 or label 1042 are selected by the user, the target utilization indicates the utilization of the entire floorplan 1050 as a percentage of the maximum occupancy of floorplan 1050 for the selected time window 1020. In other embodiments, the target utilization toolbar 1012 can be expressed in absolute terms, such as a numerical people count. The user can manually adjust target utilization underuse threshold slider 1010 and the target utilization critical mass slider 1014 to manually adjust the percentage (or absolute number) that corresponds to an indication of underuse, optimal use, and/or overuse ("critical mass") of floorplan 1050. Corresponding to the target utilization toolbar 1012 is operating hour toolbar 1060 and calendar view 1062. The operating hour tool bar 1060 allows the user to select the hours for which the graphical user interface 1000 shows occupancy statistics. For example, the user may select only a certain time period for viewing (e.g., 8 am to 6 pm) or can elect to see usage statistics over an entire 24 hour period (e.g., in the case of a business that is open and in use at all hours of a day). Based on the operating hours the user selects using the operating hours toolbar 1060, the hour range 1082 can automatically adjust accordingly. Calendar view 1062 includes day entries 1064 associated with the selected time window 1020. In the illustrated embodiment, the day entries 1064 are coded to indicate whether the floor plan 1050 exhibited underuse, optimal use, or overuse in terms of people identified within floorplan 1050 for a given day. Further, day entries 1064 include a numerical value that indicates the peak usage of the floor plan 1050 for the day indicated by the respective entry within calendar view 1062. Also, when the user hovers over or otherwise selects a respective day entry 1064, the graphical user interface 1000 dynamically changes to show data for the selected day entry 1064. For example, if day entry 1064 is selected floor plan 1050 dynamically changes to show peak occupancy data for day entry 1064 instead of the aggregated time window 1020.

Floor plan 1050 includes rooms, and spaces that can be separately grouped and/or labeled. Each space within floor plan 1050 is graphically coded to indicate the usage for the selected time window 1020. In the current embodiment, the spaces within floor plan 1050 are coded to show peak usage within the selected time window 1020, with darker colors indicating heavier use as a percentage of maximum capacity of a room and lighter colors indicating lighter use as a percentage of maximum capacity of a room. Note, however, that the user can specifically highlight a particular day by clicking on a respective day entry 1064, and the information shown throughout graphical user interface 1000 will adjust to show data for only the selected day entry 1064 (including the coding of floor plan 1050, as well as the various displays 1070-1094, described below). It should also be noted that while the embodiment shown in FIG. 10 is configured to show peak usage, in some embodiments graphical user interface 1000 can be configured to show average usage instead (e.g., averaged over the selected operating hours 1060 and time window 1020). It should also be understood that the coding of what is identified as light, optimal, or heavy use of floor plan 1050 can be adjusted by moving sliders 1054 and 1056 of usage toolbar 1052. In some embodiments, target utilization toolbar 1012 can include the functionality of usage toolbar 1052, and toolbar 1052 can be omitted. In some embodiments, the usage toolbar 1052 can indicate light use, optimal use, and heavy use with absolute numbers of people occupancy instead of percentages. In some embodiments, the usage toolbar and utilization toolbars as shown in FIGS. 10-13 can display usage/utilization in terms of person minutes, as described with respect to FIG. 7B.

On the right hand side of graphical user interface headcount 1070 indicates the maximum number of people expected for floorplan 1050. Area 1072 indicates the area of the floorplan 1050 (which may be calculated by the positional sensing system 1 or manually provided by a user of the positional sensing system 1 in other embodiments), the cost per square foot 1074, and the annual cost of leasing 1076 for floorplan 1050.

Certain spaces of the floor plan 1050 can be automatically grouped by positional sensing system 1 or manually defined by a user of the system. Exemplary groupings are shown as desks 1030, meeting rooms 1032, open collaboration spaces 1034, enclosed workspaces 1036, other spaces 1038, and café 1040. Each type 1030-1040 also includes a number indicated the number of that particular type of spaces within floor plan 1050. For example, within desk type 1030, there are 276 desks identified in floor plan 1050 and within meeting room type 1032 and there are 44 meeting rooms identified within floor plan 1050. Additionally, a user of the system can create custom labels 1042 that can mix types of spaces (e.g., desks, meeting rooms, open collaborative spaces) for which occupancy can be tracked as a group. This feature may be of use to a user who desires to track areas of floor plan 1050 associated with a particular division of a work office. For example, certain meeting rooms, desks, open collaboration spaces, etc. can be assigned to engineering employees specifically, and occupancy data can be tracked for this division specifically. Custom labels 1042 can also include a grouping of a specific type of space. For example, a group of desks can be grouped together and labeled "HR," "engineering," etc. so that occupancy data can be tracked for each label 1042 as desired. Below types 1030-1040 and labels 1042, the user can select either option for viewing floorplan occupancy by "room" or space by selecting icon 1044, or can change to a heatmap view by clicking icon 1046, which shows averaged positional data over a set period of time within floorplan 1050, as will be discussed in more detail with respect to FIG. 13.

The graphical user interface 1000 also provides statistics related to meeting room occupancy, so that a user of the positional sensing system 1 can easily monitor the occupancy of meeting rooms within floorplan 1050. For example, meeting room occupancy view 1086 includes a graphical display of each size meeting room and the number of existing meeting rooms of that size (e.g., 29 meeting rooms with capacity for four people, 2 meeting rooms with a capacity for 6 people, etc.). The bars represent average occupancy for the selected time window 1020 in the darker shade, the capacity of each meeting room is shown in the lighter shade, and the peak usage of each type of meeting room is shown with the dashed line.

Meeting room usage 1088 shows the statistics of meeting rooms in another view. As shown, different shades can be used to identify unused, light use, medium use, and heavy use in bar 1090 or slices of the pie chart 1092 and 1094. Slice 1092 shows a number of meeting rooms that underwent light use on average, during time window 1020 and slice 1094 shows a number of meeting rooms that underwent medium use, on average, during time window 1020. In the present embodiment, graphical user interface 1000 is indicating that 37 of 44 meeting rooms had medium use. It should be understood that the user can change the definition of low use, medium use, and heavy use by use of sliders 1054 and 1056 of toolbar 1052. Similarly, as described above with respect to floor plan 1050, when the user hovers over or clicks on day entry 1064, the information displayed in meeting room occupancy tab 1086 and meeting room usage tab 1088 dynamically changes to show data for the selected day entry 1064 instead of the aggregated time window 1020. In this way, the user can quickly and efficiently view and interact with data for any desired time period within the selected time window 1020.

Figure 11:
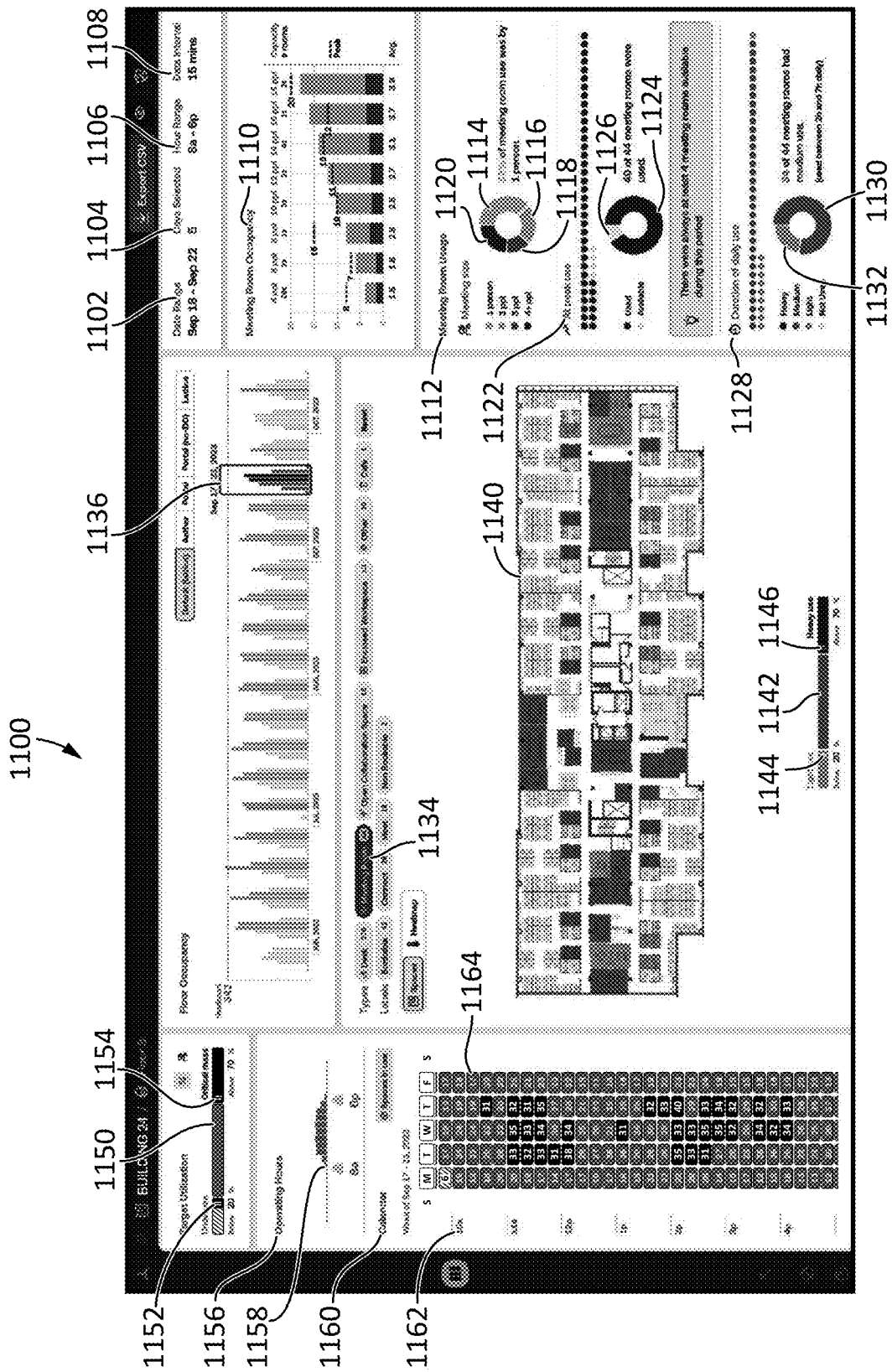
FIG. 11 depicts an exemplary graphical user interface displaying meeting room occupancy data determined by the positional sensing system, in accordance with some embodiments of the present disclosure.

FIG. 11 depicts an exemplary graphical user interface 1100 that displays meeting room occupancy data determined by the positional sensing system 1. A user of a device (e.g., a mobile device, laptop, PC, tablet, etc.) may access the graphical user interface 1100 that is based on data generated by positional sensing system 1. In this regard, graphical user interface 1100 shows a floor plan 1140 in which the positional sensing system 1 is deployed. In the embodiment shown in FIG. 11, a user has clicked on type icon 1134 which is associated with meeting rooms and has selected time window 1136 associated with a single week, September 17-September 23. Accordingly, the data shown in floor plan 1140 dynamically adjusts to the selected time window 1136 and displays data only for meeting rooms 1134 in floor plan 1140. Similarly, the data identified in 1102, 1104, and 1108 dynamically adjusts to the selection of time window 1136. For example, The date range 1102 adjusts to show the workdays of the week of September 17-September 23 (e.g., Monday, September 18 through Friday September 22$^{nd}$). The days selected displays five working days based on the time window 1136, although date range 1102 can be adjusted to not exclude any days or exclude different days as desired by the user. The hour range 1106 is associated with the operating hours tab 1156. The user can select the desired hours for which the occupancy data is displayed by adjusting sliders 1158 of the operating hours 1156, and the graphical user interface 1100 dynamically adjusts the occupancy data being displayed to show only data generated between the selected hours. Data interval 1108 is tied to the interval of each entry 1164 in the calendar window 1160. When a user selects time window 1136 on a weekly level, the calendar window 1160 dynamically adjusts to show the work week (Monday-Friday) on the top axis, and the time in 15 minute intervals on the left axis 1162. Each entry 1164 depicts the peak occupancy for the selected meeting rooms 1134, although it should be understood that in other embodiments, graphical user interface 1100 can be configured to instead show average occupancy as entry 1164. The user can change between peak and average occupancy for entry 1164 by clicking an appropriate icon (not shown). Similarly, as described above with respect to FIG. 10, a user can hover or otherwise select any icon 1164, and the information that is presented in graphical user interface 1100 will dynamically adjust to show the data for only the selected time period associated with icon 1164. In the present example, if a user clicks on icon 1164, graphical user interface 1100 will display occupancy data for Friday September 22 for the 15 minute period between 10:15 am and 10:30 am. Accordingly, floor plan 1140 will show all meeting room occupancy for the period between 10:15 am and 10:30 am in response to icon 1164 and 1134 both being selected. At any time, the user can click on icon 1134 to de-select meeting rooms, and the graphical user interface will show whole floor (including meeting rooms and all other defined space "types") for the period between 10:15 am and 10:30 am, until icon 1164 is no longer selected, at which point the data presented in graphical user interface 1100 will dynamically revert back to the time window 1136.

In a similar manner, the information shown in the meeting room usage tab 1112, meeting room occupancy tab 1110, peak usage tab 1122, and duration of daily use tab 1128 is configured to dynamically change based on the user's selection of any given time period by hovering over, clicking, or otherwise interacting with an icon 1164.

When the meeting room tab 1134 is selected, the meeting room usage tab 1112, peak usage tab 1122, and duration of daily use tab 1128 show additional information. For example, the pie chart of the meeting room usage tab shows the percentage of meeting rooms that were being used by 1 person (slice 1114), 2 people (slice 1116), three people (slice 1118), or four or more people (slice 1120). The pie chart additionally informs the user that 38% of meeting rooms were being used by only 1 person, potentially identifying that the meeting rooms were not being efficiently utilized.

The peak usage tab shows that at peak use 40 of 44 meeting rooms were being used (slice 1124) and only 4 meeting rooms were unused (slice 1126). By hovering over or otherwise interacting with the peak use tab 1122, the time and date associated with such peak use is highlighted or otherwise indicated in the calendar tab 1160, allowing the user to quickly determine the associated time of peak meeting room use.

Finally, the duration of daily use tab 1128 includes a pie chart that shows meeting room use as a function of whether the occupancy was light, medium or heavy, or unused. The user can change the definition of light, medium, or heavy as desired by using sliders 1144 and 1146 of usage bar 1142. The pie chart of the duration of daily use tab 1128 indicates that 10 meeting rooms had light use (slice 1132) and 34 of 44 meeting rooms had medium use (slice 1130).

Figure 12:
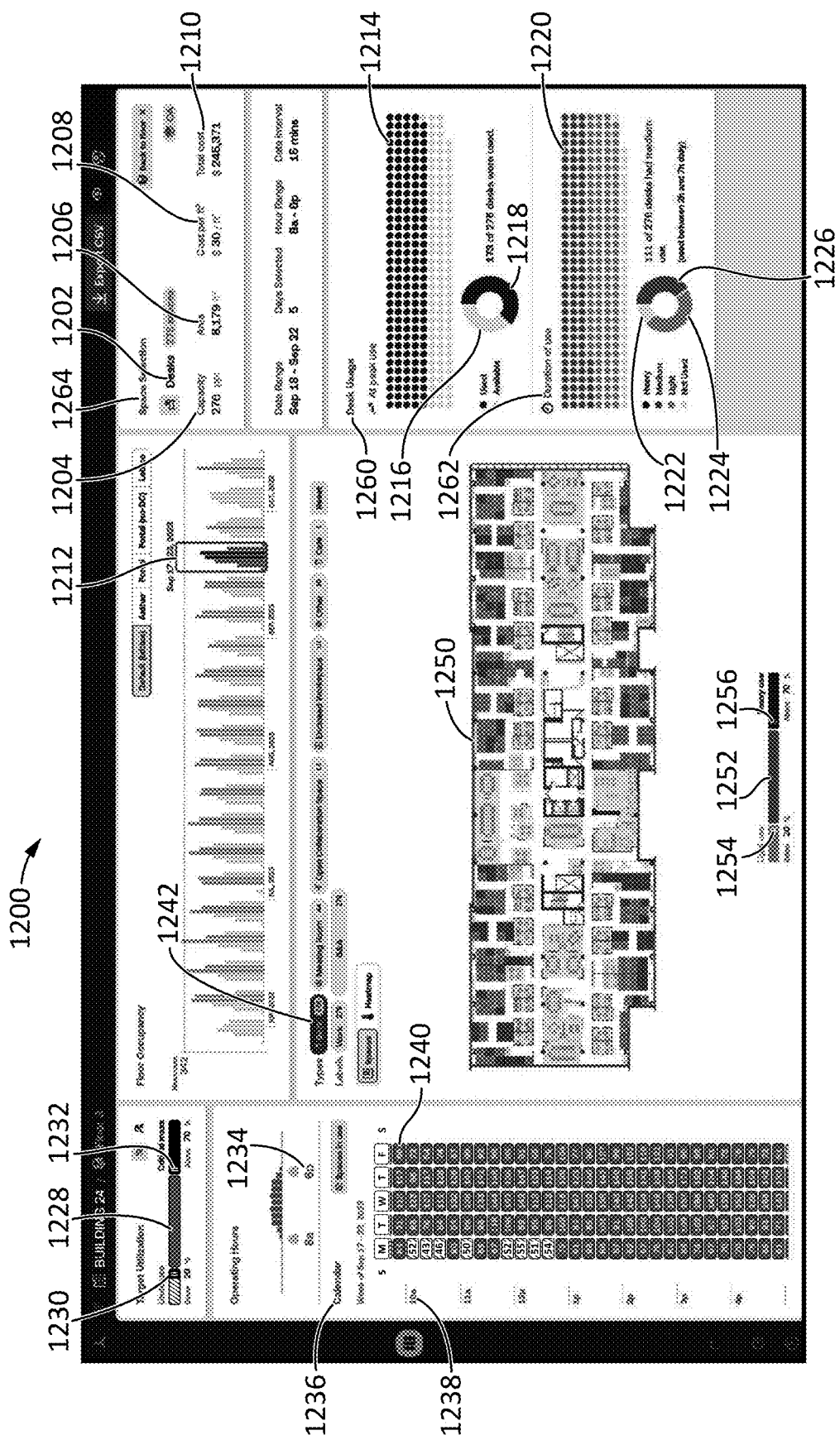
FIG. 12 depicts an exemplary graphical user interface displaying desk occupancy data determined by the positional sensing system, in accordance with some embodiments of the present disclosure.

FIG. 12 depicts exemplary graphical user interface 1200 that displays desk occupancy data determined by the positional sensing system 1. In this instance, the type label 1242 indicating "desk" has been selected by the user. The time window 1212 is selected for Sep. 17, 2023, to Sep. 23, 2023. The floor plan 1250 dynamically adjusts to show the utilization of desk space within floor plan 1250 because the type label 1242 indicating desk type is selected. Similarly, the calendar 1236 adjusts to the selected type label 1242. Entries 1240 shows the peak occupancy for desks in 15 minute intervals as previously described with respect to FIG. 11. The left axis 1238 shows the time in 15 minute intervals, and when the user highlights, clicks on, or otherwise interacts with entries 1240, the floor plan 1250, desk usage tab 1260, duration of use tab 1262, and the space selection tab 1264 dynamically adjusts to the time and date associated with the selected entry 1240.

The coding of the entries 1240 also dynamically adjusts based on the user manipulating target utilization slider 1228, for example by moving the sliders 1230 and 1232 to adjust the thresholds for target utilization as described earlier with respect to FIG. 10.

Desk usage tab 1260 shows that at peak use 173 of 276 desks were used. By hovering over desk icons 1214 and/or slices 1216 or slices 1218, the data entry 1240 is highlighted for the time and date associated with the peak usage. The duration of use tab 1262 shows how much use (e.g., as a percentage of hours selected in the operating hours tab) desks had in the selected time window 1212. The pie chart shows unused desks (slice 1222), light use (slice 1224), and medium use (slice 1226).

The space selection tab 1264 shows specific statistics related to the desk type 1242. It shows that desks 1202 are the type selected, the capacity of desks 1204, the area associated with the desks 1206, the cost per ft of the floor space 1208, and the total cost of the desk floor space 1210.

Figure 13:
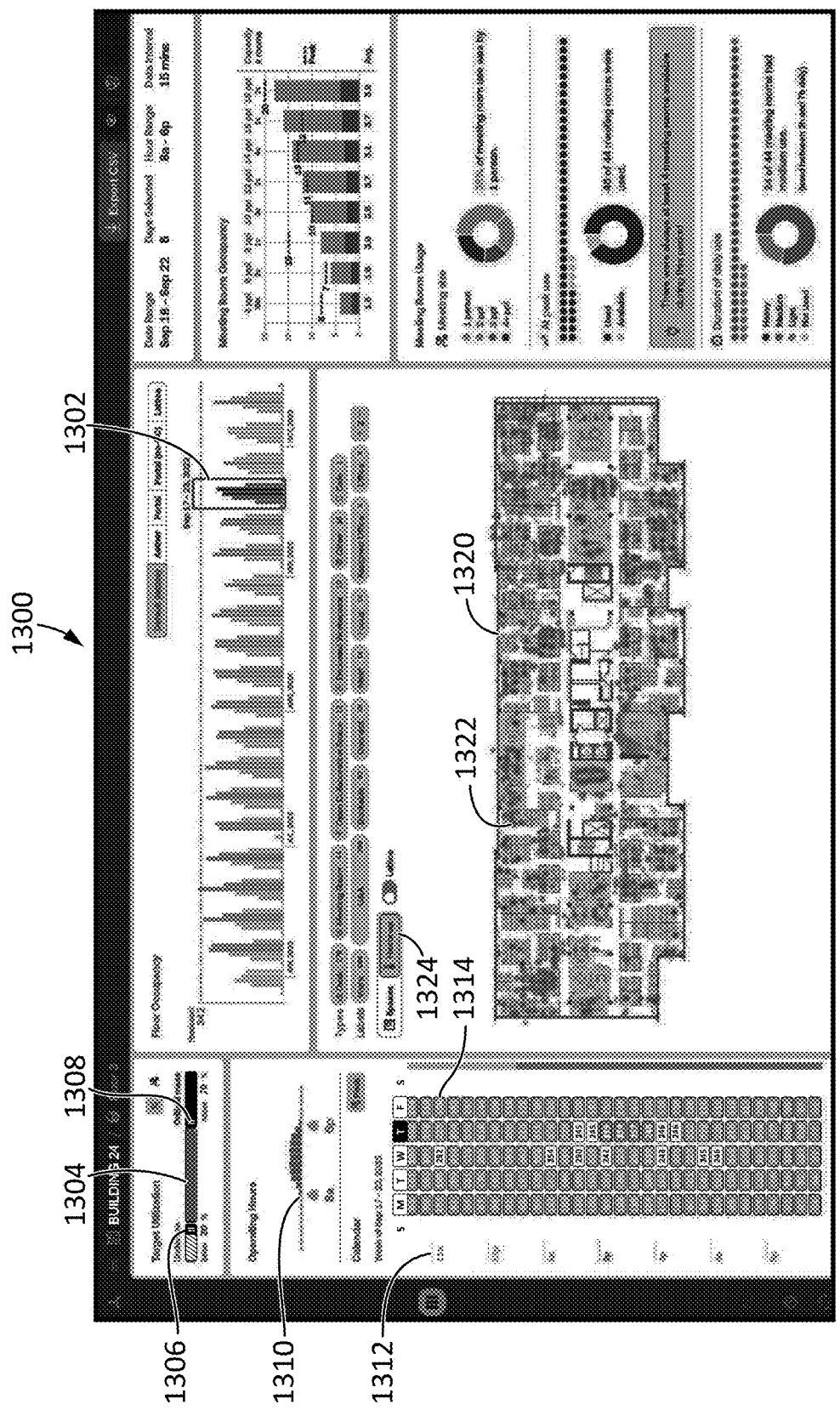
FIG. 13 depicts an exemplary graphical user interface displaying heatmap data determined by the positional sensing system, in accordance with some embodiments of the present disclosure.

FIG. 13 depicts exemplary graphical user interface 1300 that displays heatmap data determined by positional sensing system 1. In graphical user interface 1300, a user has selected the heatmap option by using icon 1324. Accordingly, floor plan 1320 dynamically adjusts to show trajectories (e.g., tracklets) of individuals detected in the environment as heat map data 1322. In the floor plan 1320, heat map data 1322 is shown aggregated over an hour of time, but the user can select the aggregation of heat map data 1322 to be over other time units, such as a working day (e.g., 8 hours). By hovering over or otherwise selecting icon 1314, floor plan 1320 dynamically adjusts to show the heatmap data 1322 associated with the time interval of the selected icon 1314, as previously described with respect to FIGS. 10-12. For example, by selecting icon 1314, the heatmap data 1322 for the time period of 11:00 am to 11:15 am for Friday Sep. 22, 2023, may be selected in the instant embodiment. The icons 1314 show the peak occupancy of the floor plan 1320 as an absolute number of detected individuals. As discussed previously, the user can adjust icons 1314 to show the average occupancy instead of the peak occupancy. Similarly, to the examples discussed with respect to FIGS. 10-12, a user can adjust the target utilization rate using target utilization toolbar 1304 by adjusting the sliders 1306 and 1308 to adjust how system represents whether floor plan 1320 is being underused, optimally used, or overused. In the instant embodiment, occupancy data is being shown for the selected time window 1302. While the target utilization toolbars and use toolbar (e.g., toolbars 1012 and 1052 shown in FIGS. 10, 1150 and 1142 in FIGS. 11, and 1228 and 1252 in FIG. 12, and 1304 in FIG. 13) are shown with thresholds as a percentage, it should be understood that in various embodiments the toolbars can use person minutes as threshold values as described with respect to FIG. 7B instead of percentages as shown FIGS. 10-13.

Figure 14:
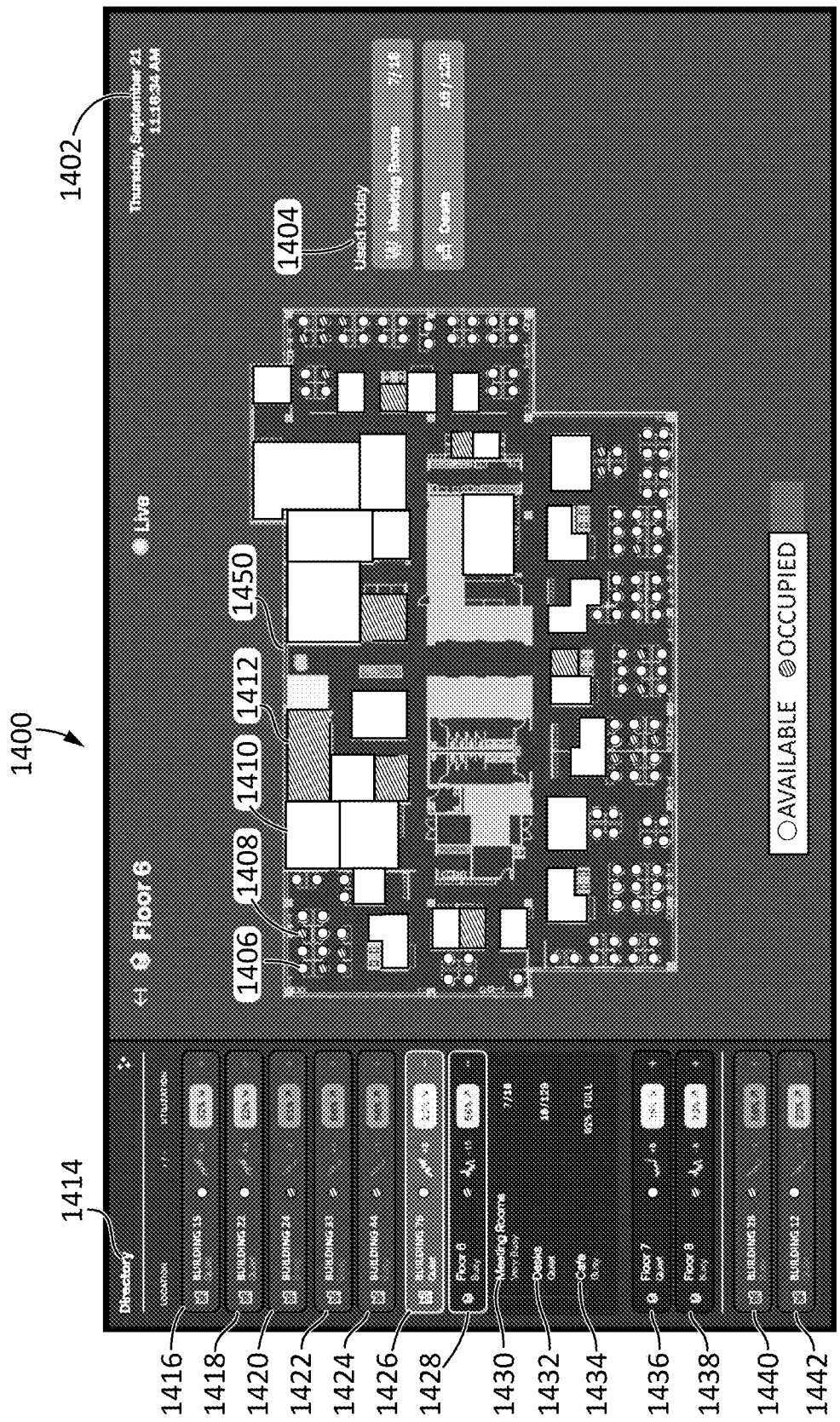
FIG. 14 depicts an exemplary graphical user interface displaying real-time occupancy data determined by the positional sensing system, in accordance with some embodiments of the present disclosure.

FIG. 14 depicts exemplary graphical user interface 1400 displaying real time occupancy data determined by positional sensing system 1. In contrast to the graphical user interfaces described with respect to FIGS. 10-13, the graphical user interface 1400 displays data collected by the positional sensing system 1 in substantially real time (e.g., data collected via the real time pipeline 810). In this regard, graphical user interface 1400 includes a directory 1414 that includes buildings that are under the control of business/organization in which the positional sensing system 1 is installed. In the present example, graphical user interface displays a number of buildings that are under the control of the business/organization and are being monitored by the positional sensing system 1. More specifically, graphical user interface 1400 includes an icon 1416 for building 15, icon 1418 for building 22, icon 1420 for building 24, icon 1422 for building 33, icon 1424 for building 44, icon 1426 for building 76, icon 1440 for building 28, and icon 1442 for building 12. In the present example, the user has selected building 76 by clicking, hovering over, or otherwise interacting with icon 1426. Icon 1428 indicating floor 6 of building 76 is selected by the user, which dynamically updates graphical user interface 1400 to display the floor plan 1450 that is associated with floor 6 of building 76. By hovering over, clicking, or otherwise interacting with icon 1436, the user can change the graphical user interface to dynamically display the floor plan and data associated with floor 7. Similarly, by hovering over, clicking, or otherwise interacting with icon 1438, the user can change the graphical user interface to dynamically display the floor plan and data associated with floor 8.

Icon 1402 displays the current date and time for the data being displayed by graphical user interface 1400. Additionally, icon 1404 shows the number of meeting rooms and desks that are currently being used within floor plan 1450 at the time and date indicated by icon 1402. It should be noted that in some embodiments, icon 1404 can be configured to show peak or average use for the day indicated by icon 1402 instead of showing real time use, as desired by the user. The floor plan 1450 indicates which desks and meeting rooms are currently vacant or occupied. For example, floor plan 1450 indicates that desk 1406 is vacant and desk 1408 is occupied based on data collected by positional sensing system 1. Similarly, meeting room 1410 is vacant and meeting room 1412 is occupied based on data collected by positional sensing system 1. The building icons show additional high level occupancy information. More specifically, each building icon shows a trend line that indicates the trend of occupancy over the last 15 minutes (using, for example, data collected as part of the historical pipeline 820) as well as a percentage utilization change associated with the trendline. Similar data is displayed per floor basis when the user drills down into a respective building. In the present example, with building 76 selected by interacting with icon 1428, the same statistics are shown for floor 6-8 of building 76. When a floor is selected, additional data is shown to the user. More specifically, with floor 6 selected (by interacting with icon 1428), graphical user interface 1400 shows the number of meeting rooms currently occupied 1430, the number of desks currently occupied 1432, and the occupancy level of the cafeteria. Note that the information displayed in 1430, 1432, and 1434 is not exhaustive, and can be programmed to display any of the information available in the previous views described with respect to FIGS. 10-13, including but not limited to custom labeled areas of mixed space type, bathrooms, collaborative spaces, etc.

Figure 15:
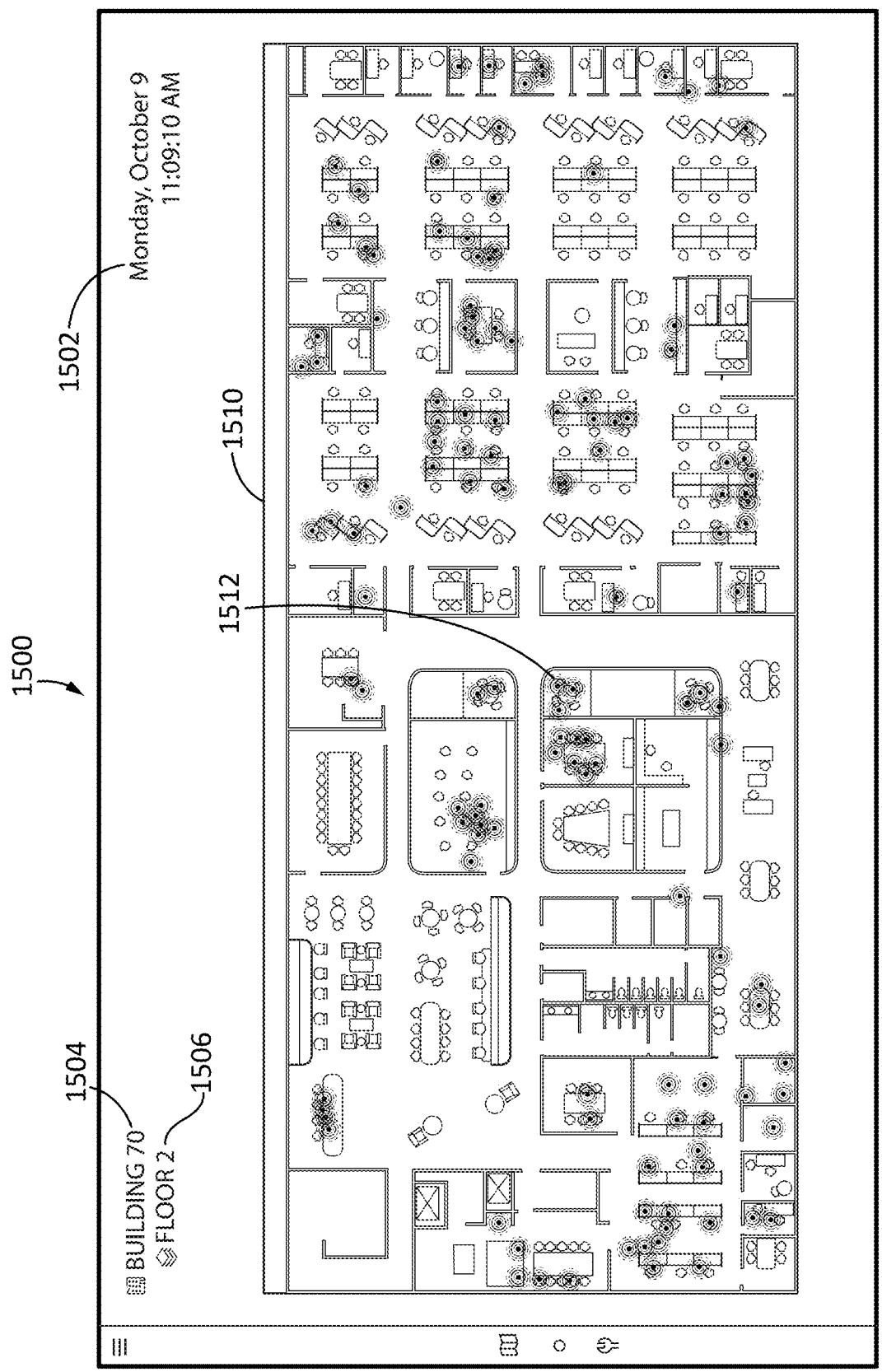
FIG. 15 depicts an exemplary graphical user interface displaying real-time heatmap data determined by the positional sensing system, in accordance with some embodiments of the present disclosure.

FIG. 15 depicts exemplary graphical user interface 1500 displaying real time heatmap data determined by positional sensing system 1. Similar to graphical user interface 1400, the information shown in graphical user interface 1500 is in substantially real time for the time indicated in icon 1502. Icon 1504 indicates that building 70 is selected and icon 1506 further indicates that floor plan 1510 is associated with floor 2 of building 70. Rather than showing occupancy data (e.g., whether a space is in use or vacant), floor plan 1510 shows a heat map of the location of people within floor plan 1510. While heat map data shown in the historical user interfaces shown in FIGS. 10-13 show aggregated trajectories of individuals over a period of between approximately 15 minutes up to a period of a full working day (e.g., between 8 hrs and 24 hours), the heat map generated in the live view of graphical user interface 1500 is aggregated over only a short time period, which can be approximately 1 minute of tracklet data in some embodiments. Graphical user interface 1500 allows a user to see the substantially real time location of all individuals within floor plan 1510.

Figure 16:
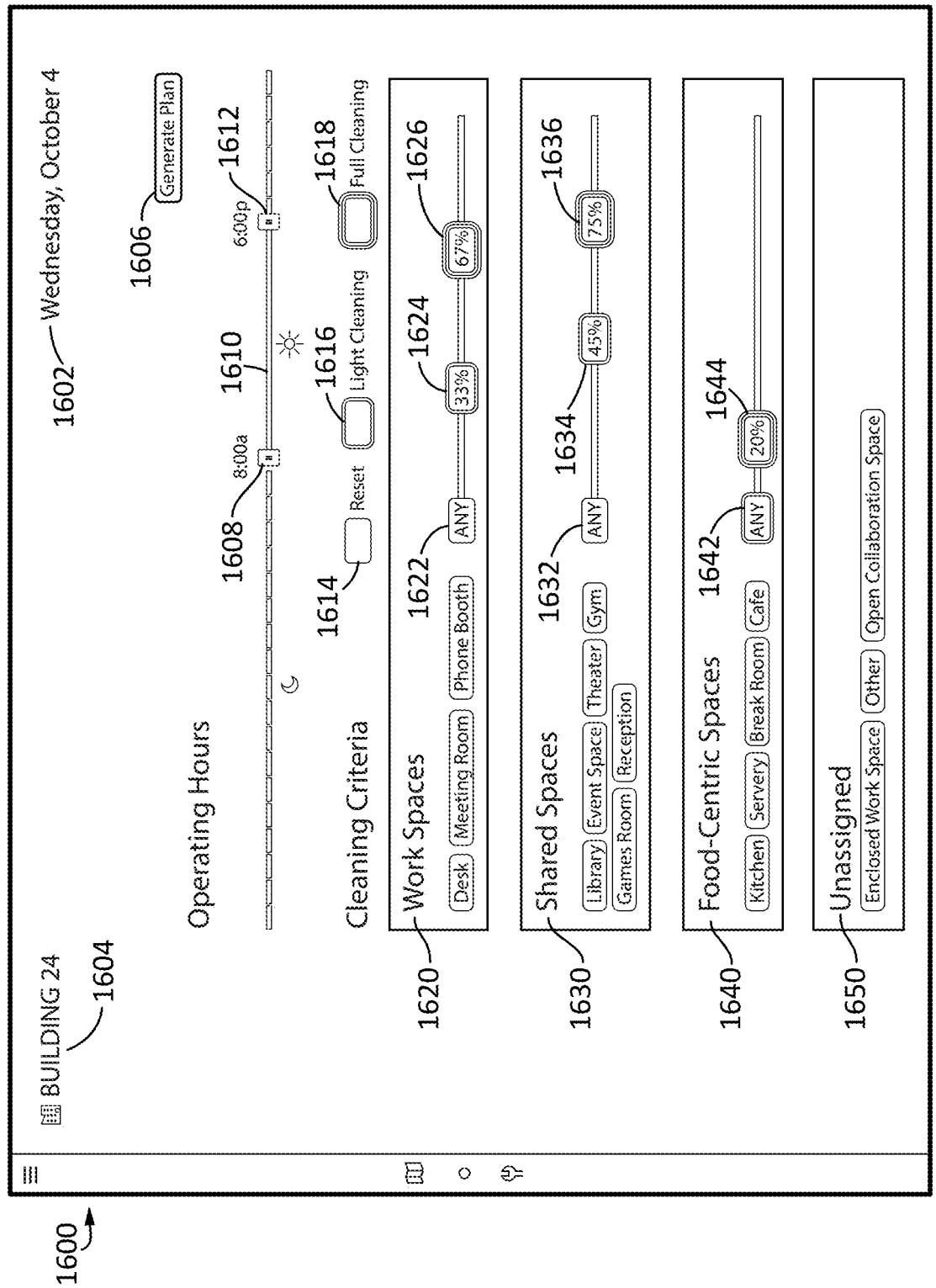
FIG. 16 depicts an exemplary graphical user interface for generating a dynamic cleaning plan based on data generated by the positional sensing system, in accordance with some embodiments of the present disclosure.

FIG. 16 depicts an exemplary graphical user interface 1600 for generating a dynamic cleaning plan based on data generated by the positional sensing system 1. Graphical user interface 1600 allows a user to generate a dynamic cleaning plan based on user-specified criteria. In this regard, the user can select the operating hours using toolbar 1610 by adjusting sliders 1608 and 1612. By adjusting sliders 1608 and 1612, the user adjusts the time window for which the positional sensing system 1 aggregates occupancy and trajectory data to be used in determining which spaces of an exemplary floorplan should be cleaned based on an amount of use or occupancy. When a certain area or space of a floor plan is used for a threshold amount of time, the positional sensing system 1 can determine that this area or space should be cleaned, and what level of cleaning the space or area should receive. In this regard, graphical user interface 1600 can allow the user to set specific threshold criteria for each type of space separately. In the present example, the graphical user interface allows the user to separately set thresholds for workspaces 1620 (e.g., desks, meeting rooms, etc.), shared spaces 1630 (e.g., library, event space, etc.), food-centric spaces 1640 (e.g., kitchen, break room, etc.), and unassigned 1650 categories. It should be understood that these groupings 1620-1650 are merely exemplary and the user can customize or otherwise select any number of groupings for separately setting dynamic cleaning thresholds. In at least some embodiments, graphical user interface 1600 can include a separate toolbar for setting thresholds for bathrooms of a given floor space. The present example shows three levels of cleaning that the positional sensing system 1 can determine for each area or space of the floor plan. In the present example, icons 1614 represents a "reset" cleaning or the lightest form of cleaning associated with the lowest threshold of use (e.g., person minutes or occupancy), icon 1616 represents a "light" cleaning associated with an intermediate threshold of use, and icon 1618 represents a "full" cleaning associated with the highest threshold of use. In this regard, for workspaces 1620, the user can select a use percentage for each threshold individually. For example, slider 1622 is set such that any percent of use informs the positional sensing system 1 to determine that a space requires a reset cleaning. Slider 1624 is set to 33%, which means that when an exemplary area or space of a floor plan has a 33% occupancy within operating hours 1610 the positional sensing system 1 determines a light cleaning is appropriate. Slider 1626 is set to 67% such that when exemplary area or space of a floor plan has a 67% occupancy within operating hours 1610, the positional sensing system 1 determines a full cleaning is appropriate. Sliders 1632, 1634, and 1636 operates in substantially the same way as described for sliders 1622, 1624, and 1626, respectively. For food-centric spaces 1640, only two sliders are shown, slider 1642 for a "light" cleaning and slider 1644 for a full cleaning. However, food-centric spaces need not be limited to only a light cleaning and a full cleaning, and can include the additional reset (e.g., lightest) cleaning option. It should also be noted that cleaning levels 1614-1618 are merely exemplary and more or fewer levels of desired cleaning can be included as dynamic cleaning options. It should also be noted that while the thresholds are shown in terms of percentages (percentage of time a given space or area is occupied by at least one person), in other embodiments, the thresholds can be designated in terms of person minutes as previously described with respect to FIG. 7B. In other words, the user can set thresholds based on how many minutes individuals spend in a room in aggregate over the operating hours 1610. As an example, if a meeting room has a first person spending 10 minutes in the room, a second person spending 30 minutes in the room, and a third person spending 180 minutes in the room, the positional sensing system 1 would determine that the meeting room has received 220 person minutes. Use of person minutes instead of a simple percentage threshold can be desirable because it accounts for the number of actual use a room or space receives more accurately than a simple percentage of occupancy (which measures if at least one person is using a space as a percentage of time). In this specific example, the user can generate a dynamic cleaning plan for building 24 as indicated by icon 1604 for the date indicated by icon 1602 by clicking on "generate plan" icon 1606. The time window adjustment enabled by slider 1610 can be for any desired unit of time. In some embodiments, the time window adjustment enabled by slider 1610 can be between 1 minute and 24 hours. In some embodiments, the time window adjustment enabled by slider 1610 can be for units of time greater than 24 hours. For example, the time window adjustment can enable the selection of a time window of a week, two weeks, and/or a month, as desired by the user, and the dynamic cleaning plan generated can be based on the selected time window.

Figure 17A:
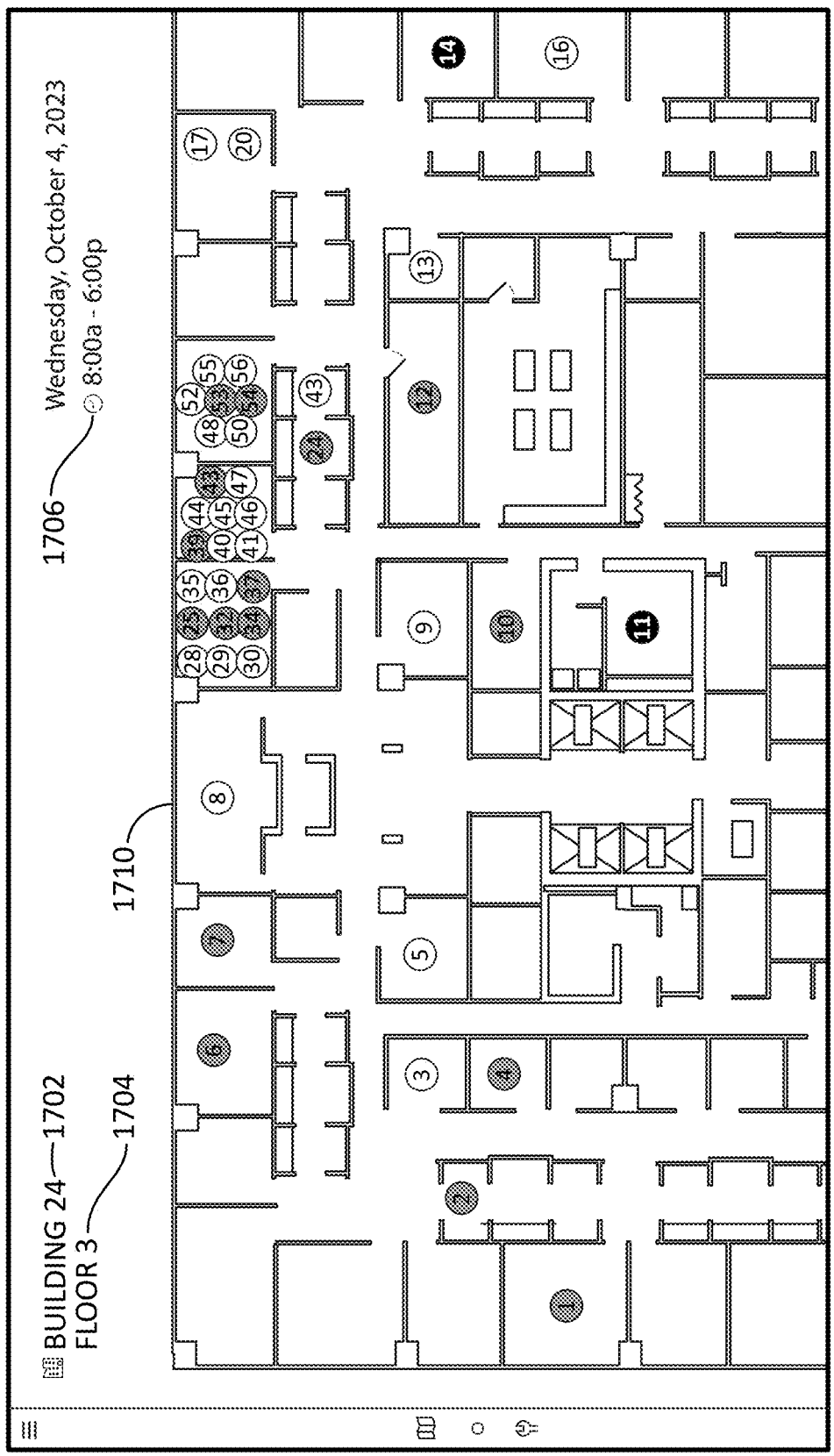
FIG. 17A depicts an exemplary dynamic cleaning plan, in accordance with some embodiments of the present disclosure.

FIG. 17A depicts an exemplary dynamic cleaning plan 1700. Continuing the example of FIG. 16, once the user selects the desired time window and usage thresholds, the system can generate the dynamic cleaning plan shown FIG. 17. The building 24 is indicated in icon 1702 as well as the floor (floor 3) in icon 1704. The time window is shown in icon 1706. Certain areas/spaces are numbered in the dynamic cleaning plan 1700 that is coded depending on the determined level of cleaning. As shown, areas are labeled between 1 and 56 and each of the labeled areas have an assigned cleaning level. In addition, the positional sensing system 1 can dynamically determine cleaning order based on the optimal route throughout the floor plan. In one embodiment, a user of the system can provide to the positional sensing system 1 the cleaning route used by cleaners of a given floor plan, and the positional sensing system 1 can use this information to determine the optimal route throughout the floor plan, including the order in which the identified spaces/areas should be cleaned. In another embodiment, the optimal route can be defined by the system based on an analysis of the floor plan including ingress/egress points mapped within the floor plan by the positional sensing system 1.

Order of cleaning is identified numerically, wherein the smaller numbers are cleaned before the larger numbers. FIG. 17B depicts a list of areas of the floor plan to be cleaned as depicted in FIG. 17A. Column 1710 shows the number of each area or space to be dynamically cleaned as part of the cleaning plan. Column 1714 identifies the type of space/area that is to be cleaned. Column 1716 shows the space/area name, and column 1718 indicates the level of cleaning determined by the data collected by the positional sensing system 1. Finally, radio icon column 1720 allows a user of the system to check off any areas/spaces as they are cleaned.

The same type of dynamic cleaning information as shown in FIGS. 17A-17B can optionally be presented by a mobile device, as shown in FIGS. 18-19. In the embodiment shown in FIG. 18, a dynamic cleaning plan for building 76, floor 6, for the date of Sep. 21, 2023, is shown as indicated by icons 1802, 1804, and 1806, respectively. The time window is indicated by icon 1808. Similar to as shown in FIG. 17B, columns 1810, 1812, 1814, and 1816 show the number of the area space to be cleaned, the name of the area/space, the type of space (e.g., meeting room, desk, etc.), and the level of cleaning determined (with one dot indicating the "reset" level of cleaning, two dots indicating "light" cleaning, and three dots indicating "full" cleaning). For example, room number 2 is indicated by 1820, which corresponds to room number 2 indicated by 1920 in FIG. 19. Room number 2 is requires a level one cleaning as shown by icon 1824. When room number 2 room is cleaned, an individual (e.g., contractor) cleaning the space can click or "check off" the room by interacting with radio icon 1826. FIG. 19 shows the building number, floor, and selected area/space name in icons 1902, 1904, and 1922, respectively. The icons within the graphical user interface indicating the rooms to be cleaned can additionally be color coded to quickly indicate the level of cleaning for each labeled area/space. It should be noted that area number 1 (icon 18281) and area number 6 (icon 1830) are greyed out to indicate that no cleaning of these areas is required, because the determined occupancy is below the minimum threshold set by the user.

Figure 20:
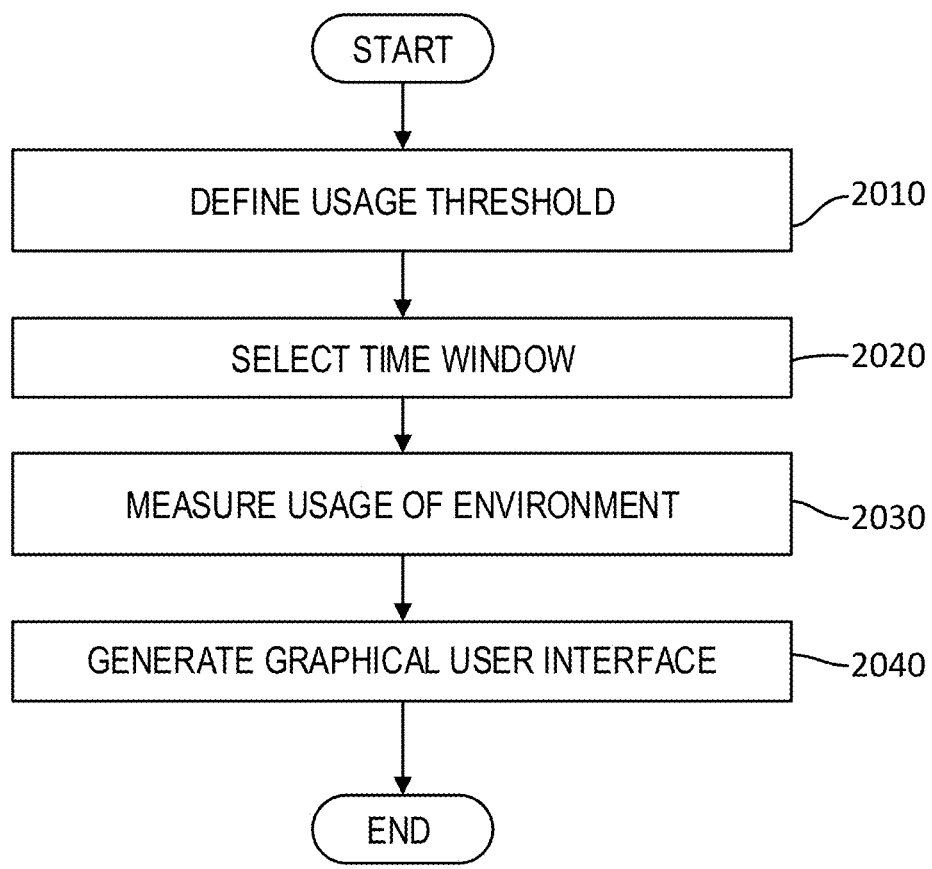
FIG. 20 is a flowchart depicting an exemplary method of generating a graphical user interface for dynamic cleaning, in accordance with some embodiments of the present disclosure.

FIG. 20 is a flowchart depicting an exemplary method of generating a graphical user interface for dynamic cleaning. In step 2010, the method can include defining a usage threshold. The usage threshold can be set similar as was described with respect to FIG. 16. It should be understood that the usage threshold can include at least one threshold (to clean or not to clean), two thresholds (no cleaning, light cleaning, heavy cleaning), three thresholds (no cleaning, lightest cleaning, medium cleaning, heavy cleaning), or any other user specified number of thresholds as desired by the user of positional sensing system 1. Instep 2020, the method can include selecting a time window. The time window selection can be substantially similar to what was described with respect to operating hour toolbar 1610. This time window can be any unit of time less between one minute and 24 hours and can be adjusted as discussed with respect to sliders 1608 and 1612 of operating hour toolbar 1610. Based on the selected time window, the positional sensing system 1 determines occupancy, trajectory, and/or usage data that is limited to the selected time window.

In step 2030, the method can include measuring usage of the environment. In this regard, the positional sensing system 1 can aggregate the positional data captured by each positional sensing device (and/or depth sensing devices 11) for the given time window, as described in more detail with respect to FIG. 4.

In step 2040, the method can include generating a graphical user interface comprising the dynamic cleaning plan. The dynamic cleaning plan can indicate areas of the floor plan that should be cleaned, the level of cleaning, and the optimal cleaning route (based on following the labeled numbers in ascending order, for example). The dynamic cleaning plan can be presented to the user in a variety of graphical user interfaces, such as the ones shown in FIGS. 17A-17B, and FIGS. 18-19.

Figure 21:
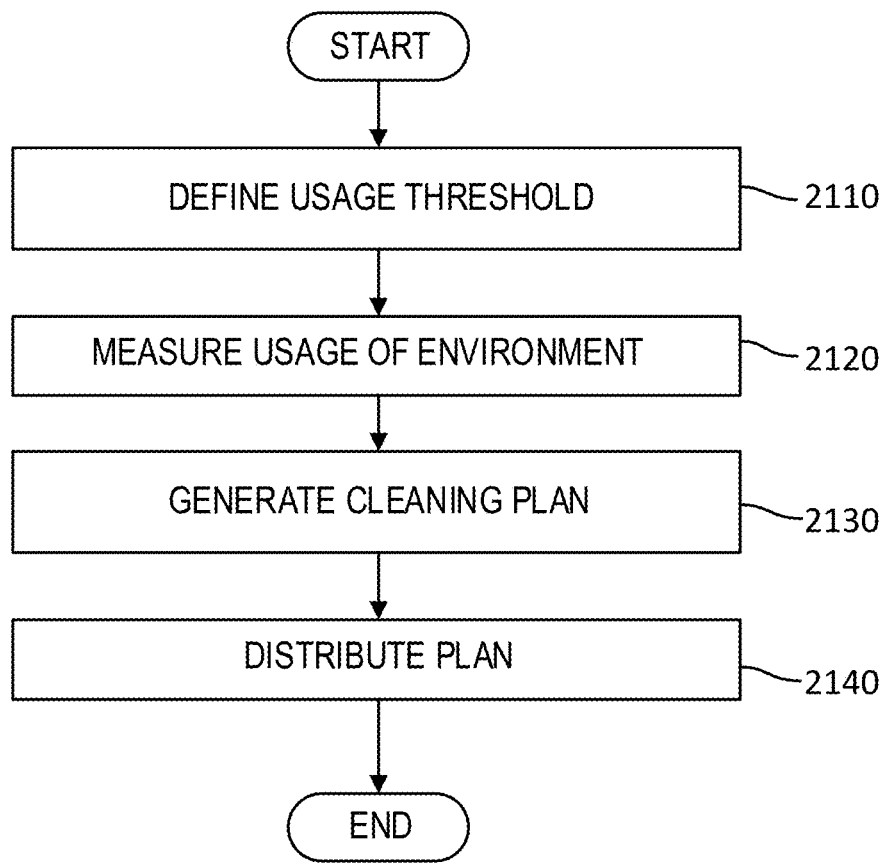
FIG. 21 is a flowchart depicting an exemplary method of generating a dynamic cleaning plan, in accordance with some embodiments of the present disclosure.

FIG. 21 is a flowchart depicting an exemplary method of generating a dynamic cleaning plan. In step 2110, the method can include defining a usage threshold. The usage threshold can be set similar as was described with respect to FIG. 16. It should be understood that the usage threshold can include at least one threshold (to clean or not to clean), two thresholds (no cleaning, light cleaning, heavy cleaning), three thresholds (no cleaning, lightest cleaning, medium cleaning, heavy cleaning), or any other user specified number of thresholds as desired by the user of positional sensing system 1.

In step 2120, the method can include measuring usage of the environment. In this regard, the positional sensing system 1 can aggregate the positional data captured by each positional sensing device (and/or depth sensing devices 11) for the given time window, as described in more detail with respect to FIG. 4.

In step 2130, the method can include generating a cleaning plan. The dynamic cleaning plan can indicate areas of the floor plan that should be cleaned, the level of cleaning, and the optimal cleaning route (based on following the labeled numbers in ascending order, for example). In step 2140, the method can include distributing the plan. The plan can be distributed to the cleaning crew associated with a respective building, environment, and/or floor plan. The dynamic cleaning plan can be distributed using a variety of means. For example, a user (e.g., cleaning crew) can use a device (e.g., device 25) to access an API of the positional cleaning system 1 that provides the dynamic cleaning plan as presented in FIGS. 17A-17B and/or FIGS. 18-19. This method may be understood as a "pull" request in which the data is pulled from server 20 via an API. In another embodiment, the dynamic cleaning plan, once generated, can be "pushed" to a device (e.g., device 25) via the API of server 20. In yet other embodiments, the dynamic cleaning plan can be emailed or texted to a device 25. In some embodiments, the dynamic cleaning plan can be provided in a printable format so that the cleaners can print the dynamic cleaning plan and manually check off areas of the environment as they are cleaned.

By means of the methods and systems described above, a real-time, accurate, and highly-scalable solution for tracking people's trajectories and determining occupancy counts can be implemented, while still remaining conscious of privacy and retaining anonymity of the people it monitors. Unlike optical cameras that collect images that must later be processed and/or anonymized, the systems and methods herein are anonymized from the start, as they do not store personally-identifiable information. The positional sensing devices track objects within its field of view in an anonymous manner such that stored data cannot be correlated to the identity of any specific person being monitored. The system gathers anonymous data, meaning the system has no way to determine the identity, gender, facial features, or other recognizable information of individual people. Accordingly, an accurate and anonymous trajectories of people can be provided to be accessible via a cloud-based interface. Businesses and customers may have access to real-time, historical, trajectory data, which can also be used to determine occupancy of monitored areas, which may allow businesses and customers to optimize their management and schedules in view of that data. Further, the data can be viewed at different levels of granularity, providing for highly-flexible analysis thereof.

Example Uses

Beyond the dynamic cleaning example described with respect to FIGS. 20 and 21, the disclosed system and methods include many additional applications. In one embodiment, the positional sensing system 1 can be used to determine when certain spaces should be cleaned intra-daily. For example, previously, cleaning staff would clean certain common areas, such as food halls, break rooms, and/or bathrooms of an environment on a set schedule. This involves many inefficiencies. For example, certain areas of the environment may not need cleaning as frequently as is being provided. In other cases, certain areas of the environment may be receiving less cleaning than is optimal. Accordingly, the positional sensing system 1 can monitor any desired area of an environment (e.g., a bathroom) using positional sensing devices 10, depth sensing devices 11, or a combination of both. The positional sensing system 1 can monitor the amount of use an area is receiving, for example by measuring the occupancy time when at least one individual is present within the given area and notifying a user (e.g., via user device 25) when the monitored area should be cleaned based on a threshold amount of use. In another example, the method can monitor "person minutes" as previously described with respect to FIG. 7B above, and send a notification to a user when the given area should be cleaned based on a threshold amount of person minutes of use for the area. The advantage of using person minutes instead of occupancy time when at least one individual is present, is that more individuals using an area generally will cause the area to need more cleaning than if a single individual spends time within the area.

In another example, rather than determining when a given area, such as a bathroom, needs to be cleaned throughout a workday, the positional sensing system 1 can be used to determine when a food-centric area should be restocked with food. For example, the positional sensing system 1 can be leveraged to track people minutes within a given food-centric area, and can provide an alert (e.g., via device 25) when a threshold amount of person minutes is surpassed. In response, staff of the environment can be deployed to restock food in the food-centric area.

In another embodiment, the positional sensing system 1 can determine whether an optimal amount of cleaning staff is being used to clean a given area. For example, a team of 10 full time employees may be contracted to clean a given floor plan on a nightly basis. The positional sensing system 1 can be configured to monitor the cleaning time these 10 full time employees take to clean the given floor plan. This cleaning data can be aggregated over a period of time (e.g., three months, but this period of time can be varied, as desired) to build a cleaning profile for these employees and determine an average amount of time it takes for the 10 full time employees to clean the given floor plan. Once the data is aggregated, the positional sensing system 1 can provide to a user (e.g., via device 25) statistics regarding the average cleaning time for the 10 full time employees over the measured period of time. The user can provide to positional sensing system 1 data indicating a target average completion time for the nightly cleaning, and based upon this data, the positional sensing system 1 can generate a recommendation indicating a revised number of full time employees that would be sufficient to clean the given floor plan in the target average completion time. For example, the system may recommend that for the given floor plan, only 8 full time employees would be necessary. In some embodiments, the system may recommend a number of full time employees and a number of part time employees, in place of 10 full time employees. In such a way, the positional sensing system 1 allows a business to optimize deployed cleaning resources in an efficient manner.

In another example, the positional sensing system 1 can be used to control lighting. When the positional sensing system 1 detects motion within a given area of the environment, the API of server 20 can send a push notification (e.g., to third party server 35) which can be used to trigger a variety of functionality, such as enabling lighting in the area corresponding to detected motion). Similarly, when no motion is detected in the given area for a threshold amount of time (e.g., 30 seconds, 1 minute, 3 minutes, 5 minutes, etc.), a push notification can be sent by API of server 20 to third party server 35 to trigger the disabling of lighting, allowing for efficient use of resources. In a similar way, the positional sensing system 1 can be used to dynamically control HVAC settings. For example, the API of server 20 can send an enable command to third party server 35 to enable HVAC (air conditioning or heat) whenever the presence of an individual is detected in a given space (e.g., a hotel room). Similarly, whenever no individual is detected in the space for a threshold period of time, API of server 20 can send a disable command to third party server 35 which can disable the HVAC system to prevent waste of resources.

In yet another example, the positional sensing system 1 can integrate into meeting room reservation systems deployed by a business. For example, a third party system controlled by a business (e.g., via third party server 35) can include functionality for booking meeting rooms. The positional sensing system 1 can be integrated into the meeting reservation system in the following ways. When a room is booked, but no individuals are detected within the meeting room for a threshold period of time during the booking (e.g., 1 minute, 3 minutes, 5 minutes, 10 minutes, etc.) the positional sensing system 1 can send a push notification (via API of server 20) to third party server 35 triggering third party server 35 to release the booked room because of a lack of use. Similarly, the system can be used to perform "ghost meeting analysis" and provide statistics on the rates at which meeting rooms are booked and remain unused during the period of the reservation. These statistics can be aggregated by positional sensing system 1 and be made available (e.g., via push or pull functionality of API of server 20) to third party server 35 for further analysis by the business. In yet another example, positional sensing system 1 can monitor unused spaces and indicate to users (e.g., via device 25) what rooms are empty and are available for use and/or booking.

In another example use case, a short term rental property can be outfitted with the positional sensing system 1. The positional sensing system 1 can be configured to provide an alert to an owner or rental property manager (e.g., via device 25) whenever the occupancy for a rental property exceeds a threshold value that can be set by the owner and/or property manager. In this way, positional sensing system 1 can be used to effectively prevent overcrowding and unsanctioned parties/events at rental properties.

In another example use, the positional sensing system 1 can be used to measure flow through an area. For example, positioning sensing system 1 can track the trajectory of individuals through a cafeteria starting from their entrance into the space, following each individual's tracklets throughout the cafeteria space, and tracking each individuals exit from the space. The positional sensing system 1 can use the collected trajectory data to determine how long (on average) each individual spends within the cafeteria, and these statistics can be provided to the administrator of the cafeteria, the peak occupancy of the cafeteria, and the average occupancy of the cafeteria. The administrator of the cafeteria can use this information to optimize the capacity of the cafeteria and determine whether the space is being optimally utilized, underutilized, or over utilized. In a similar manner, the positional sensing system 1 can be deployed at large scale events, such as conferences, music festivals, etc. The environment of such events can be monitored by the positional sensing system 1, and based on the collected data, the administrators of the event can determine whether certain areas within the environment are over capacity. For example, a certain pathway in an event may create a bottleneck, and the positional sensing system 1 can detect and alert the administrator when a bottleneck is detected based on collected occupancy and trajectory (tracklet) data.

In certain embodiments, the positional sensing system 1 can be deployed in both indoor and outdoor environments. In outdoor environments and environments in which the humidity level is not controlled. The humidity level can be monitored by each positional sensing device 10 (e.g., via temperature sensor 251 as described above). In response to high levels of humidity being sensed, the server 20 can send a command to the given positional sensing device 10 to switch a high-humidity profile, to ensure that the phased array system 210 properly functions for the given environment and positional sensing system 1 continues to accurately operate for the given humidity levels.

In another embodiment, the positional sensing system 1 can be used as a form of security system. For example, certain areas of a floor plan can be designated as restricted. In response, if the positional sensing system 1 detects an individual within the restricted area, the API of server 20 can provide a notification (e.g., push notification) to a third party server 35 or device 25 indicating an administrator of the floor plan that a person has been detected in the restricted area, and their location so that security can be requested into the area.

The disclosed embodiments can be implemented according to at least the following clauses:

Clause 1: A system comprising: one or more positional sensing devices configured to monitor an environment, the environment comprising one or more areas; a server operatively coupled to the plurality of positional sensing devices via a network the server being configured to: receive (i) a usage threshold and (ii) time window selection from a user; receive positional data for one or more detected individuals within the environment from the one or more positional sensing devices; determine usage levels for each of the one or more areas based on the positional data; and generate a dynamic cleaning plan based on (i) the usage threshold, (ii) the time window selection, and (iii) the usage levels.

Clause 2: The system of clause 1, wherein the positional data further comprises timestamp data.

Clause 3: The system of clause 2, wherein determining usage levels for each of the one or more areas based on the positional data further comprises: determining a length of time each of the one or more detected individuals remains within each of the one or more areas based on the positional data and the timestamp data; and aggregating the length of time each of the one or more detected individuals remains within each of the one or more areas.

Clause 4: The system of clause 3, wherein determining a length of time each of the one or more detected individuals remains within each of the one or more areas further comprises determining a trajectory for each of the one or more detected individuals through each of the one or more areas based on the (i) positional data and (ii) timestamp data.

Clause 5: The system of clause 1, wherein the usage threshold comprises a first threshold associated with a first level of cleaning and a second threshold associated with a second level of cleaning.

Clause 6: The system of clause 1, wherein each of the one or more positional sensing devices comprises: a pulse generator for generating pulses; a sensor for measuring data regarding a phase shift or amplitude change in modulated pulses from the pulse generator to one or more detected objects; and a first module for converting the data regarding the phase shift or amplitude change into (i) positional data and (ii) timestamp data for the one or more detected objects.

Clause 7: The system of clause 1, wherein the time window selection comprises a time less than or equal to twenty four hours.

Clause 8: The system of clause 1, wherein the server is further configured to transmit the dynamic cleaning plan to the user.

Clause 9: The system of clause 8, wherein transmitting the dynamic cleaning plan further comprises sending a push request to the user, receiving a pull request from the user, sending an email to the user, sending an SMS to the user, or combinations thereof.

Clause 10: The system of clause 1, wherein the usage threshold comprises a usage threshold for each of the one or more areas.

Clause 11: A method comprising: receiving, at a server, (i) a usage threshold and (ii) time window selection from a user; receiving positional data for one or more detected individuals within an environment from one or more positional sensing devices operatively coupled to the server via a network, wherein the environment comprises one or more areas; determining, by the server, usage levels for each of the one or more areas based on the positional data; and generating a dynamic cleaning plan based on (i) the usage threshold, (ii) the time window selection, and (iii) the usage levels.

Clause 12: The method of clause 11, wherein the positional data further comprises timestamp data.

Clause 13: The method of clause 12, wherein determining usage levels for each of the one or more areas based on the positional data further comprises: determining a length of time each of the one or more detected individuals remains within each of the one or more areas based on the positional data and the timestamp data; and aggregating the length of time each of the one or more detected individuals remains within each of the one or more areas.

Clause 14: The method of clause 13, wherein determining a length of time each of the one or more detected individuals remains within each of the one or more areas further comprises determining, by the server, a trajectory for each of the one or more detected individuals through each of the one or more areas based on the (i) positional data and (ii) timestamp data received from the one or more positional sensing devices.

Clause 15: The method of clause 11, wherein the usage threshold comprises a first threshold associated with a first level of cleaning and a second threshold associated with a second level of cleaning.

Clause 16: The method of clause 11, wherein each of the one or more positional sensing devices comprises: a pulse generator for generating pulses; a sensor for measuring data regarding a phase shift or amplitude change in modulated pulses from the pulse generator to one or more detected objects; and a first module for converting the data regarding the phase shift or amplitude change into (i) positional data and (ii) timestamp data for the one or more detected objects.

Clause 17: The method of clause 11, wherein the time window selection comprises a time less than or equal to twenty four hours.

Clause 18: The method of clause 11, further comprising transmitting, by the server, the dynamic cleaning plan to the user.

Clause 19: The method of clause 18, wherein transmitting the dynamic cleaning plan further comprises sending a push request to the user, receiving a pull request from the user, sending an email to the user, sending an SMS to the user, or combinations thereof.

Clause 20: The method of clause 11, wherein the usage threshold comprises a usage threshold for each of the one or more areas.

Clause 21: A system comprising: one or more positional sensing devices configured to monitor an environment, the environment comprising one or more areas; a server operatively coupled to the one or more positional sensing devices via a network the server being configured to: transmit, to a user, a first graphical user interface comprising one or more usage threshold selection inputs and a time window selection input, each of the one or more usage threshold selection inputs and the time window selection input associated with a dynamic cleaning plan; receive, from the user, one or more usage thresholds and a time window via the first graphical user interface; receive positional data for one or more detected individuals within the environment from the one or more positional sensing devices; and determine usage levels for each of the one or more areas based on the positional data; and generate a second graphical user interface comprising the dynamic cleaning plan.

Clause 22: The system of clause 21, wherein the second graphical user interface comprises: a determined cleaning level for each of the one or more areas; and a cleaning order among each of the one or more areas.

Clause 23: The system of clause 21, wherein the second graphical user interface comprises one or more inputs for indicating that a respective area of the one or more areas has been cleaned and wherein the server is further configured to receive, from the user, an indication that a first area of the one or more areas has been cleaned via a selection of a first input of the one or more inputs.

Clause 24: The system of clause 21, wherein the second graphical user interface further comprises a map of the environment.

Clause 25: The system of clause 22, wherein the second graphical user interface further comprises a list of each of the one or more areas and the determined cleaning level for each of the one or more areas.

Clause 26: The system of clause 21, wherein the positional data further comprises timestamp data.

Clause 27: The system of clause 26, wherein determining usage levels for each of the one or more areas based on the positional data further comprises: determining a length of time each of the one or more detected individuals remains within each of the one or more areas based on the positional data and the timestamp data; and aggregating the length of time each of the one or more detected individuals remains within each of the one or more areas.

Clause 28: The system of clause 27, wherein determining a length of time each of the one or more detected individuals remains within each of the one or more areas further comprises determining a trajectory for each of the one or more detected individuals through each of the one or more areas based on the (i) positional data and (ii) timestamp data.

Clause 29: The system of clause 21, wherein each of the one or more positional sensing devices comprises: a pulse generator for generating pulses; a sensor for measuring data regarding a phase shift or amplitude change in modulated pulses from the pulse generator to one or more detected objects; and a first module for converting the data regarding the phase shift or amplitude change into (i) positional data and (ii) timestamp data for the one or more detected objects.

Clause 30: The system of clause 21, wherein the time window comprises a time less than or equal to twenty four hours.

Clause 31: A method, comprising: transmitting, by a server and to a user, a first graphical user interface comprising one or more usage threshold selection inputs and a time window selection input, each of the one or more usage threshold selection inputs and the time window selection input associated with a dynamic cleaning plan; receiving, from the user, one or more usage thresholds and a time window via the first graphical user interface; receiving positional data for one or more detected individuals within an environment from one or more positional sensing devices operatively coupled to the server via a network, wherein the environment comprises one or more areas; determining usage levels for each of the one or more areas based on the positional data; and generating a second graphical user interface comprising the dynamic cleaning plan.

Clause 32: The method of clause 31, wherein the second graphical user interface comprises: a determined cleaning level for each of the one or more areas; and a cleaning order among each of the one or more areas.

Clause 33: The method of clause 31, wherein the second graphical user interface comprises one or more inputs for indicating that a respective area of the one or more areas has been cleaned and the method further comprising receiving, by the server and from the user, an indication that a first area of the one or more areas has been cleaned via a selection of a first input of the one or more inputs.

Clause 34: The method of clause 31, wherein the second graphical user interface further comprises a map of the environment.

Clause 35: The method of clause 32, wherein the second graphical user interface further comprises a list of each of the one or more areas and the determined cleaning level for each of the one or more areas.

Clause 36: The method of clause 31, wherein the positional data further comprises timestamp data.

Clause 37: The method of clause 36, wherein determining usage levels for each of the one or more areas based on the positional data further comprises: determining a length of time each of the one or more detected individuals remains within each of the one or more areas based on the positional data and the timestamp data; and aggregating the length of time each of the one or more detected individuals remains within each of the one or more areas.

Clause 38: The method of clause 37, wherein determining a length of time each of the one or more detected individuals remains within each of the one or more areas further comprises determining a trajectory for each of the one or more detected individuals through each of the one or more areas based on the (i) positional data and (ii) timestamp data.

Clause 39: The method of clause 31, wherein each of the one or more positional sensing devices comprises: a pulse generator for generating pulses; a sensor for measuring data regarding a phase shift or amplitude change in modulated pulses from the pulse generator to one or more detected objects; and a first module for converting the data regarding the phase shift or amplitude change into (i) positional data and (ii) timestamp data for the one or more detected objects.

Clause 40: The method of clause 1, wherein the time window comprises a time less than or equal to twenty four hours.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system comprising:
   one or more positional sensing devices configured to monitor an environment, the environment comprising one or more areas;
   a server operatively coupled to the plurality of positional sensing devices via a network the server being configured to:
      receive (i) a usage threshold and (ii) time window selection from a user;
      receive positional data for one or more detected individuals within the environment from the one or more positional sensing devices;
      determine usage levels for each of the one or more areas based on the positional data and
      generate a dynamic cleaning plan based on (i) the usage threshold, (ii) the time window selection, and (iii) the usage levels.

2. The system of claim 1, wherein the positional data further comprises timestamp data.

3. The system of claim 2, wherein determining usage levels for each of the one or more areas based on the positional data further comprises:
   determining a length of time each of the one or more detected individuals remains within each of the one or more areas based on the positional data and the timestamp data; and
   aggregating the length of time each of the one or more detected individuals remains within each of the one or more areas.

4. The system of claim 3, wherein determining a length of time each of the one or more detected individuals remains within each of the one or more areas further comprises determining a trajectory for each of the one or more detected individuals through each of the one or more areas based on the (i) positional data and (ii) timestamp data.

5. The system of claim 1, wherein the usage threshold comprises a first threshold associated with a first level of cleaning and a second threshold associated with a second level of cleaning.

6. The system of claim 1, wherein each of the one or more positional sensing devices comprises:
   a pulse generator for generating pulses;
   a sensor for measuring data regarding a phase shift or amplitude change in modulated pulses from the pulse generator to one or more detected objects; and
   a first module for converting the data regarding the phase shift or amplitude change into (i) positional data and (ii) timestamp data for the one or more detected objects.

7. The system of claim 1, wherein the time window selection comprises a time less than or equal to twenty four hours.

8. The system of claim 1, wherein the server is further configured to transmit the dynamic cleaning plan to the user.

9. The system of claim 8, wherein transmitting the dynamic cleaning plan further comprises sending a push request to the user, receiving a pull request from the user, sending an email to the user, sending an SMS to the user, or combinations thereof.

10. The system of claim 1, wherein the usage threshold comprises a usage threshold for each of the one or more areas.

11. A method comprising:
    receiving, at a server, (i) a usage threshold and (ii) time window selection from a user;
    receiving positional data for one or more detected individuals within an environment from one or more positional sensing devices operatively coupled to the server via a network, wherein the environment comprises one or more areas;
    determining, by the server, usage levels for each of the one or more areas based on the positional data; and
    generating a dynamic cleaning plan based on (i) the usage threshold, (ii) the time window selection, and (iii) the usage levels.

12. The method of claim 11, wherein the positional data further comprises timestamp data.

13. The method of claim 12, wherein determining usage levels for each of the one or more areas based on the positional data further comprises:
    determining a length of time each of the one or more detected individuals remains within each of the one or more areas based on the positional data and the timestamp data; and
    aggregating the length of time each of the one or more detected individuals remains within each of the one or more areas.

14. The method of claim 13, wherein determining a length of time each of the one or more detected individuals remains within each of the one or more areas further comprises determining, by the server, a trajectory for each of the one or more detected individuals through each of the one or more areas based on the (i) positional data and (ii) timestamp data received from the one or more positional sensing devices.

15. The method of claim 11, wherein the usage threshold comprises a first threshold associated with a first level of cleaning and a second threshold associated with a second level of cleaning.

16. The method of claim 11, wherein each of the one or more positional sensing devices comprises:
    a pulse generator for generating pulses;
    a sensor for measuring data regarding a phase shift or amplitude change in modulated pulses from the pulse generator to one or more detected objects; and
    a first module for converting the data regarding the phase shift or amplitude change into (i) positional data and (ii) timestamp data for the one or more detected objects.

17. The method of claim 11, wherein the time window selection comprises a time less than or equal to twenty four hours.

18. The method of claim 11, further comprising transmitting, by the server, the dynamic cleaning plan to the user.

19. The method of claim 18, wherein transmitting the dynamic cleaning plan further comprises sending a push request to the user, receiving a pull request from the user, sending an email to the user, sending an SMS to the user, or combinations thereof.

20. The method of claim 11, wherein the usage threshold comprises a usage threshold for each of the one or more areas.

\* \* \* \* \*

UNITED STATES PATENT AND TRADEMARK OFFICE
CERTIFICATE OF CORRECTION

PATENT NO. : 12,007,469 B1
APPLICATION NO. : 18/503060
DATED : June 11, 2024
INVENTOR(S) : Andrew Farah et al.

Page 1 of 1

It is certified that error appears in the above-identified patent and that said Letters Patent is hereby corrected as shown below:

On the Title Page

Item (73) Assignee, the text "Block, Inc., Oakland, CA (US)" should be deleted and replaced with --Density, Inc., San Francisco, CA (US)--

Item (74) Attorney, Agent or Firm, the text "Brian T. Sattizahn, Esq." should be deleted and replaced with --Ilya S. Mirov, Esq.--

Signed and Sealed this
Twenty-fourth Day of December, 2024

Derrick Brent
*Acting Director of the United States Patent and Trademark Office*